United States Patent
Zhang

(10) Patent No.: US 8,890,884 B2
(45) Date of Patent: Nov. 18, 2014

(54) IMAGE PROCESSING DEVICE CONVERTING A COLOR REPRESENTED BY INPUTTED DATA INTO A COLOR WITHIN A COLOR REPRODUCTION RANGE OF A PREDETERMINED OUTPUT DEVICE AND IMAGE PROCESSING METHOD THEREOF

(75) Inventor: Xiaomang Zhang, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 260 days.

(21) Appl. No.: 13/500,474

(22) PCT Filed: Jun. 15, 2010

(86) PCT No.: PCT/JP2010/060119
§ 371 (c)(1),
(2), (4) Date: Apr. 5, 2012

(87) PCT Pub. No.: WO2011/061954
PCT Pub. Date: May 6, 2011

(65) Prior Publication Data
US 2012/0194539 A1 Aug. 2, 2012

(30) Foreign Application Priority Data
Nov. 20, 2009 (JP) ................. 2009-264475

(51) Int. Cl.
*G09G 5/00* (2006.01)
*G09G 5/02* (2006.01)
(Continued)

(52) U.S. Cl.
CPC ........... *G09G 3/3607* (2013.01); *H04N 1/6058* (2013.01); *H04N 9/67* (2013.01); *G09G*
(Continued)

(58) Field of Classification Search
None
See application file for complete search history.

(56) References Cited

U.S. PATENT DOCUMENTS 5,258,829 A 11/1993 Matsunaga et al.
5,428,720 A * 6/1995 Adams, Jr. .................... 345/604
(Continued)

FOREIGN PATENT DOCUMENTS

EP 2 015 588 1/2009
JP 4-291591 A 10/1992
(Continued)

OTHER PUBLICATIONS

International Search Report.

*Primary Examiner* — Joni Richer
*Assistant Examiner* — Yi Wang
(74) *Attorney, Agent, or Firm* — Harness, Dickey & Pierce, P.L.C.

(57) ABSTRACT

Provided is an image processing device. A first color space converting unit converts image data in an RGB colorimetric system, which has a color gamut wider than a color gamut of a liquid crystal panel into image data in an XYZ colorimetric system. A three-dimensional nonlinear color gamut converting unit performs conversion on tristimulus values of the XYZ signal. At this time, the image data is classified into four colors and converted respectively such that the first color is displayed in a color accurate to the inputted data, the second color is displayed such that saturation of the second color is increased, the third color is displayed using a color gamut of a predetermined range out of the color gamut of the liquid crystal panel, and the fourth color is displayed in a color corresponding to a boundary of the color gamut of the liquid crystal panel.

26 Claims, 16 Drawing Sheets

(51) Int. Cl.

| | | |
|---|---|---|
| *G09G 5/36* | (2006.01) | |
| *H04N 5/46* | (2006.01) | |
| *H04N 9/30* | (2006.01) | |
| *G03F 3/08* | (2006.01) | |
| *H04N 1/46* | (2006.01) | |
| *G06K 9/40* | (2006.01) | |
| *G06K 9/36* | (2006.01) | |
| *G06K 9/00* | (2006.01) | |
| *H04N 1/60* | (2006.01) | |
| *H04N 9/67* | (2006.01) | |
| *G09G 3/36* | (2006.01) | |
| *G09G 3/20* | (2006.01) | |

(52) U.S. Cl.
CPC .............. 2340/06 (2013.01); *G09G 2320/0242* (2013.01); *G09G 3/2003* (2013.01)
USPC ........... 345/589; 345/591; 345/600; 345/606; 345/643; 345/549; 348/557; 348/791; 358/518; 358/523; 358/525; 382/167; 382/274; 382/276

(56) References Cited

U.S. PATENT DOCUMENTS

| | | | |
|---|---|---|---|
| 5,933,252 | A | 8/1999 | Emori et al. |
| 6,567,543 | B1 | 5/2003 | Shiraiwa et al. |
| 6,882,445 | B1 | 4/2005 | Takahashi et al. |
| 8,638,340 | B2 * | 1/2014 | Holub .......................... 345/589 |
| 2006/0012724 | A1 | 1/2006 | Park |
| 2009/0196494 | A1 | 8/2009 | Kanai |
| 2009/0278982 | A1 | 11/2009 | Imai et al. |
| 2009/0284554 | A1 | 11/2009 | Doser |

FOREIGN PATENT DOCUMENTS

| | | | |
|---|---|---|---|
| JP | 3155768 | A | 8/1994 |
| JP | 11098371 | A | 4/1999 |
| JP | 2000354171 | A | 12/2000 |
| JP | 2005-530449 | | 10/2005 |
| JP | 2006-086728 | | 3/2006 |
| JP | 2008078737 | A | 4/2008 |
| JP | 2008086029 | A | 4/2008 |
| JP | 2008-203308 | | 9/2008 |
| JP | 4241902 | | 6/2009 |

* cited by examiner

Fig.3

|  |  | R (RED) | G (GREEN) | B (BLUE) | W (WHITE) |
|---|---|---|---|---|---|
| xvYCC | x | 0.6400 | 0.3000 | 0.1500 | 0.3127 |
|  | y | 0.3300 | 0.6000 | 0.0600 | 0.3290 |
| LIQUID CRYSTAL PANEL (ONE EXAMPLE) | x | 0.6496 | 0.2840 | 0.1499 | 0.2744 |
|  | y | 0.3288 | 0.6324 | 0.0540 | 0.2765 |

Fig.12

| i | $K_1[i]$ |
|---|---|
| 1 | 0 |
| 2 | 0.221199 |
| 3 | 0.393469 |
| ⋮ | ⋮ |
| 29 | 0.999447 |
| 30 | 0.999569 |
| 31 | 0.999665 |

|  |  | R (RED) | G (GREEN) | B (BLUE) | W (WHITE) |
|---|---|---|---|---|---|
| HDTV STANDARD (ITU-R BT.709 STANDARD) | x | 0.6400 | 0.3000 | 0.1500 | 0.3127 |
|  | y | 0.3300 | 0.6000 | 0.0600 | 0.3290 |
| LIQUID CRYSTAL PANEL (ONE EXAMPLE) | x | 0.6496 | 0.2840 | 0.1499 | 0.2744 |
|  | y | 0.3288 | 0.6324 | 0.0540 | 0.2765 |

}~91
}~92

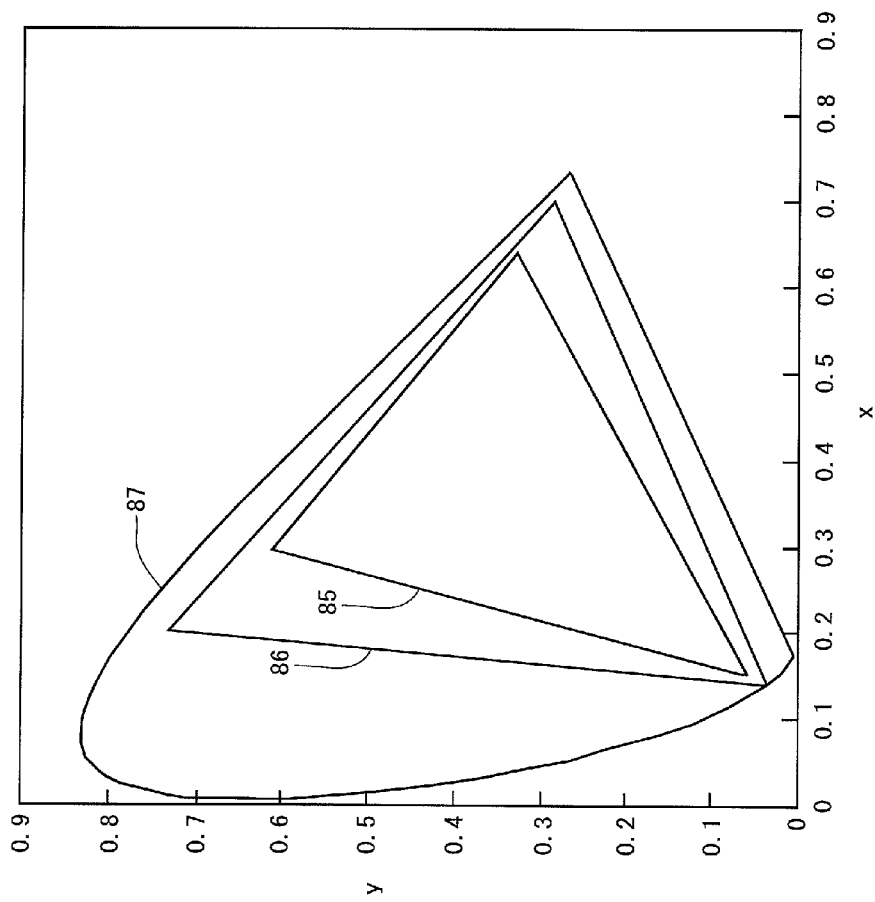

IMAGE PROCESSING DEVICE CONVERTING A COLOR REPRESENTED BY INPUTTED DATA INTO A COLOR WITHIN A COLOR REPRODUCTION RANGE OF A PREDETERMINED OUTPUT DEVICE AND IMAGE PROCESSING METHOD THEREOF

TECHNICAL FIELD

The present invention relates to an image processing device and an image processing method, and in particular, to a technique of converting a color reproduction range between inputted data and output data.

BACKGROUND ART

In general, a color reproduction range (color gamut) of display devices, printing devices, image pickup devices, and the like is different by the model. In addition, for color television apparatuses, the color reproduction range of inputted video signals is different by the employed television system. For this reason, conventionally, when generating output data based on inputted data, color conversion processing of a variety of types has been performed in order to output color as accurately as possible to inputted data regardless of differences in the color reproduction range. For example, when performing HDTV (High Definition Television) broadcasting using a color television apparatus that employs a liquid crystal panel, signals in a standard specified by ITU-R (International Telecommunication Union Radiocommunications Sector) BT.709 (hereinafter referred to as the "HDTV standard") are supplied to the color television apparatus from an external signal source. In this case, the signals supplied to the color television apparatus from the external signal source are RGB signals. In the color television apparatus, mapping (matching) processing of a color gamut of the RGB signals supplied from the signal source to a color gamut in the liquid crystal panel that constitutes the color television apparatus (hereinafter referred to as the "color gamut conversion processing") is performed. Then, voltages corresponding to values of colors included in the RGB signals obtained through the color gamut conversion processing are applied to the liquid crystal layer. With this, colors are displayed in a display unit of the liquid crystal panel as accurately as possible to colors represented by the RGB signals supplied from the signal source. The following describes such color gamut conversion processing performed in the color television apparatus in detail.

FIG. 14 is a table for showing chromaticity coordinate values of primary colors (coordinate values in an xy chromaticity diagram) in the HDTV standard and chromaticity coordinate values of primary colors of one liquid crystal panel that constitutes a display device (color television apparatus). Referring to FIG. 14, for example, it can be seen that "the value of the chromaticity coordinate (x, y) for R (red) is (0.6400, 0.3300) in the HDTV standard". In this case, by performing normalization so that brightness Y of W (white) in the XYZ color space is 1 based on information related to the HDTV standard represented by a reference numeral 91 in FIG. 14, a following equation (1) expressing a relation between the RGB values and the XYZ values can be obtained. Here, X, Y, and Z are tristimulus values in an XYZ colorimetric system.

$$\begin{pmatrix} X \\ Y \\ Z \end{pmatrix} = \begin{pmatrix} 0.4124, & 0.3576, & 0.1805 \\ 0.2126, & 0.7152, & 0.0722 \\ 0.0913, & 0.1192, & 0.9505 \end{pmatrix} \begin{pmatrix} R \\ G \\ B \end{pmatrix}_{in} \quad (1)$$

Similarly, based on information related to the liquid crystal panel represented by a reference numeral 92 in FIG. 14, a following equation (2) expressing a relation between the RGB values and the XYZ values can be obtained.

$$\begin{pmatrix} X \\ Y \\ Z \end{pmatrix} = \begin{pmatrix} 0.4091, & 0.3101, & 0.2840 \\ 0.2071, & 0.6906, & 0.1023 \\ 0.0136, & 0.0913, & 0.5085 \end{pmatrix} \begin{pmatrix} R \\ G \\ B \end{pmatrix}_{out} \quad (2)$$

Furthermore, where "right side in the equation (1)=the right side in the equation (2)", a following equation (3) can be obtained.

$$\begin{pmatrix} R \\ G \\ B \end{pmatrix}_{out} = \begin{pmatrix} 1.0002, & 0.1021, & -0.0056 \\ 0.0075, & 0.0024, & 0.0130 \\ 0.0033, & 0.0174, & 0.6294 \end{pmatrix} \begin{pmatrix} R \\ B \\ G \end{pmatrix}_{in} \quad (3)$$

In this case, the equation (3) is to obtain the values of the respective RGB colors corresponding to values of voltage to be applied to a liquid crystal layer in the liquid crystal panel based on the RGB signals in the HDTV standard supplied from the signal source. Specifically, as shown in FIG. 15, an RGB signal $RGB_{in}$ in the HDTV standard is inputted to a display device (color television apparatus) 9 from a signal source 93, and the RGB signal $RGB_{in}$ is converted based on the equation (3) by a color gamut conversion processing unit 94. Then, an RGB signal $RGB_{out}$ obtained through the conversion processing by the color gamut conversion processing unit 94 is supplied to a liquid crystal panel 95. In this manner, colors accurate to colors represented by the RGB signal $RGB_{in}$ supplied from the signal source 93 are displayed in a display unit of the liquid crystal panel 95.

In relation to the present invention, the following prior art documents are known. Japanese Unexamined Patent Application Publication No. H04-291591 discloses an invention relating to a color display device capable of reproducing colors of any of inputted video signals having different color reproduction ranges from each other without a color reproduction error. Japanese Unexamined Patent Application Publication No. 2008-78737 discloses a technique of preventing waste of a color gamut of an image output device by correcting brightness or luminance. Japanese Unexamined Patent Application Publication No. 2008-86029 discloses a method of acquiring desired color reproduction by utilizing a standard color space with an extended color gamut.

PRIOR ART DOCUMENTS

Patent Documents

[Patent Document 1] Japanese Unexamined Patent Application Publication No. H04-291591
[Patent Document 2] Japanese Unexamined Patent Application Publication No. 2008-78737
[Patent Document 3] Japanese Unexamined Patent Application Publication No. 2008-86029

SUMMARY OF THE INVENTION

Problems to be Solved by the Invention

In the meantime, as a standard for an extended color space for a motion picture, a standard called the "xvYCC standard" ("xvYCC" is a registered trademark) is defined as an international standard (IEC61966-2-4). According to the xvYCC standard, a color reproduction range is extended as compared to the conventional standard while maintaining compatibility with the "ITU-R BT0.709" standard. Here, the color reproduction range in the xvYCC standard is described with reference to FIGS. 16 and 17. In FIG. 16, a vertical axis indicates a luminance signal (Y), and a horizontal axis indicates color difference signal (CrCb). Further, a color reproduction range in the HDTV standard is represented by a square defined by a reference numeral 81, and the color reproduction range in the xvYCC standard is represented by a square defined by a reference numeral 82. As can be seen from FIG. 16, in the xvYCC standard, a luminance value can take a value greater than 1 or a negative value. Moreover, in quantization, (if the data is 8 bit) a value from 1 to 15 and a value from 241 to 254 are used as a video signal. In this manner, the color reproduction range in the xvYCC standard is noticeably extended as compared to that in the HDTV standard. Furthermore, FIG. 17 shows a CIE1931 chromaticity diagram. In FIG. 17, the color reproduction range in the HDTV standard is represented by a triangle defined by a reference numeral 85, a color reproduction range of a common liquid crystal panel is represented by a triangle defined by a reference numeral 86, and a range including all the colors is defined by a curved line indicated by a reference numeral 87. According to the xvYCC standard, almost all the colors can be represented. Specifically, the color reproduction range in the xvYCC standard is wider than the color reproduction range in the HDTV standard, and even wider than the color reproduction range 86 of the liquid crystal panel. It should be noted that, in the following description, out of the colors within the curved line indicated by the reference numeral 87, a color that is not included in the color reproduction range 85 in the HDTV standard is referred to as an "extended color" for convenience sake.

When inputted data including data of the above-described extended color is supplied to the display device, if the color gamut conversion processing is performed based on the xvYCC standard, a color within the color reproduction range of the panel is displayed accurately to the inputted data. However, for a color out of colors that are not the extended colors (the colors within the color reproduction range in the HDTV standard) and that is not a memory color, to perform display taking advantage of a color reproduction performance of the panel is more preferable than to perform display accurately to the inputted data, as the color is displayed clearly. From the above, when the color gamut conversion processing is performed, a color that is not included in the extended colors is displayed in a shade paler than the shade that should be originally displayed. By contrast, when the color gamut conversion processing is not performed, data of the extended color is subjected to clipping process. In this case, continuity in color of the data of the extended color deteriorates, and it is not possible to obtain a high-definition image based on data using the extended color space. As used herein, the "clipping process" refers to a process of converting a value of data of the extended color having a value over a maximum value that can be outputted by the panel (maximum output value) into the maximum output value.

Thus, an object of the present invention is to provide an image processing device capable of displaying an image taking advantage of a color reproduction performance of a panel while ensuring a color to be displayed based on data of an extended color when inputted data including data of the extended color is supplied.

Means for Solving the Problems

A first aspect of the present invention is directed to an image processing device converting a color represented by inputted data into a color within a color reproduction range of a predetermined output device, the image processing device comprising:

a first color space converting unit configured to convert image data in an RGB colorimetric system obtained based on the inputted data into first XYZ data which is image data in an XYZ colorimetric system;

an XYZ data converting unit configured to generate second XYZ data which is image data in the XYZ colorimetric system by performing predetermined conversion processing to X, Y, and Z values as tristimulus values that constitute the first XYZ data, the second XYZ data representing the color within the color reproduction range of the output device; and a second color space converting unit configured to convert the second XYZ data into image data in the RGB colorimetric system, wherein to the first color space converting unit, image data representing a color within a color reproduction range wider than the color reproduction range of the output device is supplied as the inputted data.

According to a second aspect of the present invention, in the first aspect of the present invention, the XYZ data converting unit:

categorizes the first XYZ data into first color data, second color data, third color data, and fourth color data, the first color data representing a color within a color reproduction range corresponding to a first boundary line provided in an xy chromaticity diagram, the second color data representing a color having a chromaticity coordinate outside the first boundary line in the xy chromaticity diagram and within a color reproduction range based on a predetermined standard that is compatible with a standard for the inputted data, the third color data representing a color outside the color reproduction range based on the predetermined standard and within a color reproduction range corresponding to a third boundary line provided in the xy chromaticity diagram so as to include the color reproduction range of the output device, and the fourth color data representing a color having a chromaticity coordinate outside the third boundary line in the xy chromaticity diagram, and performs the conversion processing to the X, Y, and Z values such that, for the first color data, a color represented by the first XYZ data is identical with a color represented by the second XYZ data, such that, for the second color data, the color reproduction range obtained by the second XYZ data is wider than the color reproduction range obtained by the first XYZ data, such that, for the third color data, the color represented by the second XYZ data has a chromaticity coordinate outside a second boundary line provided in the xy chromaticity diagram so as to include the color reproduction range based on the predetermined standard and is within the color reproduction range of the output device, and such that, for the fourth color data, the color represented by the second XYZ data has a chromaticity coordinate along a line expressing the color reproduction range of the output device in the xy chromaticity diagram.

According to a third aspect of the present invention, in the second aspect of the present invention, when performing the conversion processing to data of each of pixels included in the first XYZ data, the XYZ data converting unit:

obtains a first coordinate, a second coordinate, a third coordinate, a fourth coordinate, a fifth coordinate, and a sixth coordinate in the xy chromaticity diagram, the first coordinate being a chromaticity coordinate for data of each of the pixels, the second coordinate being a chromaticity coordinate of an intersection point between a straight line for conversion and the first boundary line, the third coordinate being a chromaticity coordinate of an intersection point between the straight line for conversion and a line expressing the color reproduction range based on the predetermined standard, the fourth coordinate being a chromaticity coordinate of an intersection point between the straight line for conversion and the second boundary line, the fifth coordinate being a chromaticity coordinate of an intersection point between the straight line for conversion and a line expressing the color reproduction range of the output device, and the sixth coordinate being a chromaticity coordinate of an intersection point between the straight line for conversion and the third boundary line, the straight line for conversion being a straight line passing through a predetermined reference coordinate and the first coordinate, and obtains a seventh coordinate out of chromaticity coordinates along the straight line for conversion, Where a chromaticity coordinate of data after the conversion processing has been performed to the data of each of the pixels is taken as the seventh coordinate, such that, for the first color data, the first coordinate is identical with the seventh coordinate, such that, for the second color data, a proportion of a distance between the second coordinate and the first coordinate to a distance between the second coordinate and the third coordinate is equal to a proportion of a distance between the second coordinate and the seventh coordinate to a distance between the second coordinate and the fourth coordinate, such that, for the third color data, a proportion of a distance between the third coordinate and the first coordinate to a distance between the third coordinate and the sixth coordinate is equal to a proportion of a distance between the fourth coordinate and the seventh coordinate to a distance between the fourth coordinate and the fifth coordinate, and such that, for the fourth color data, the fifth coordinate is identical with the seventh coordinate.

According to a fourth aspect of the present invention, in the second aspect of the present invention, when performing the conversion processing to data of each of pixels included in the first XYZ data, the XYZ data converting unit:

obtains a first coordinate, a second coordinate, a third coordinate, a fourth. coordinate, a fifth coordinate, and a sixth coordinate in the xy chromaticity diagram, the first coordinate being a chromaticity coordinate for data of each of the pixels, the second coordinate being a chromaticity coordinate of an intersection point between a straight line for conversion and the first boundary line, the third coordinate being a chromaticity coordinate of an intersection point between the straight line for conversion and a line expressing the color reproduction range based on the predetermined standard, the fourth coordinate being a chromaticity coordinate of an intersection point between the straight line for conversion and the second boundary line, the fifth coordinate being a chromaticity coordinate of an intersection point between the straight line for conversion and a line expressing the color reproduction range of the output device, and the sixth coordinate being a chromaticity coordinate of an intersection point between the straight line for conversion and the third boundary line, the straight line for conversion being a straight line passing through a predetermined reference coordinate and the first coordinate, and.

obtains a seventh coordinate, where a chromaticity coordinate of data after the conversion processing has been performed to the data of each of the pixels is taken as the seventh such that, for the first color data, the seventh coordinate takes the first coordinate, such that, for the second color data, the seventh coordinate takes a chromaticity coordinate along the straight line for conversion closer to the fourth coordinate from the second coordinate by a distance obtained by multiplying a distance between the second coordinate and the fourth coordinate by a first factor expressed by a function of a basic factor where a value obtained by dividing a distance between the second coordinate and the first coordinate by a distance between the second coordinate and the third coordinate is taken as the basic factor, such that, for the third color data, the seventh coordinate takes a chromaticity coordinate along the straight line for conversion closer to the fifth coordinate from the fourth coordinate by a distance obtained by multiplying a distance between the fourth coordinate and the fifth coordinate by a first factor expressed by a function of a basic factor where a value obtained by dividing a distance between the third coordinate and the first coordinate by a distance between the third coordinate and the sixth coordinate is taken as the basic factor, and such that, for the fourth color data, the seventh coordinate takes the fifth coordinate.

According to a fifth aspect of the present invention, in the fourth aspect of the present invention, the XYZ data converting unit obtains the first factor for the second color data and the first factor for the third color data based on a following equation:

$$k_1 = 1 - e^{-kq}$$

where $k_1$ is the first factor, e is a base of natural logarithm, k is the basic factor, and q is a positive factor that is arbitrarily determinable to each of the second color data and the third color data.

According to a sixth aspect of the present invention, in the fourth aspect of the present invention, the image processing device further comprises a first look-up table that previously stores a plurality of values of the first factor each in association with a predetermined index for each of the second color data and the third color data, wherein the XYZ data converting unit acquires a value of the first factor from the first look-up table using an index obtained based on the basic factor.

According to a seventh aspect of the present invention, in the third aspect of the present invention, the XYZ data converting unit obtains, when performing the conversion processing to the second color data, the third color data, and the fourth color data out of the data of each of the pixels included in the first XYZ data, a value of brightness for data of each of the pixels to be included in the second XYZ data such that a proportion of a maximum value of brightness at the seventh coordinate to a maximum value of brightness at the first coordinate is equal to a proportion of brightness for data after the conversion processing has been performed to the data of the corresponding pixel to brightness for the data of the corresponding pixel.

According to an eighth aspect of the present invention, in the fourth aspect of the present invention, the XYZ data converting unit obtains, when performing the conversion processing to the second color data and the third color data out of the data of each of the pixels included in the first XYZ data, a value of brightness for data of each of the pixels to be included in the second XYZ data based on a following equation by using a second factor expressed by a function of the basic factor:

$$Y_1=((1-k_2)+(Y_a\times k_2))\times Y$$

where, $Y_1$ is the brightness for the data of the corresponding pixel to be included in the second XYZ data, Y is the brightness for the data of the corresponding pixel included in the first XYZ data, $k_2$ is the second factor, and $Y_a$ is a value obtained by dividing a maximum value of brightness at the seventh coordinate by a maximum value of brightness at the first coordinate.

According to a ninth aspect of the present invention, in the eighth aspect of the present invention, the XYZ data converting unit obtains the second factor for the second color data and the second factor for the third color data based on a following equation:

$$k_2=1-e^{-kr}$$

where, $k_2$ is the second factor, e is a base of natural logarithm, k is the basic factor, and r is a positive factor that is arbitrarily determinable to each of the second color data and the third color data.

According to a tenth aspect of the present invention, in the eighth aspect of the present invention, the image processing device further comprises a second look-up table that previously stores a plurality of values of the second factor each in association with a predetermined index for each of the second color data and the third color data, wherein the XYZ data converting unit acquires a value of the second factor from the second look-up table using an index obtained based on the basic factor.

According to an eleventh aspect of the present invention, in the second aspect of the present invention, the first boundary line is provided such that a chromaticity coordinate of D65 which is a standard light source is included within the first boundary line.

According to a twelfth aspect of the present invention, in the second aspect of the present invention, the first boundary line is provided such that chromaticity coordinates of memory colors including at least a white color and a flesh color are included within the first boundary.

According to a thirteenth aspect of the present invention, in the first aspect of the present invention, the inputted data is data complying with an xvYCC standard.

According to a fourteenth aspect of the present invention, in the first aspect of the present invention, the image processing device further comprises a third color space converting unit configured to receive image data in a YCbCr colorimetric system as the inputted data and convert the image data in the YCbCr colorimetric system into image data in the RGB colorimetric system.

A fifteenth aspect of the present invention is directed to a display device, comprising:

a display panel configured to display an image; and the image processing device in the first aspect of the present invention, wherein the display panel displays the image based on the data in the RGB colorimetric system generated by the second color space converting unit.

A sixteenth aspect of the present invention is directed to an image processing method of converting a color represented by inputted data into a color within a color reproduction range of a predetermined output device, the image processing method comprising:

a first color space converting step of converting image data in an RGB colorimetric system obtained based on the inputted data into first XYZ data which is image data in an XYZ colorimetric system, the inputted data being image data representing a color within a color reproduction range wider than the color reproduction range of the output device;

an XYZ data converting step of generating second XYZ data which is image data in the XYZ colorimetric system by performing predetermined conversion processing to X, Y, and Z values as tristimulus values that constitute the first XYZ data, the second XYZ data representing the color within the color reproduction range of the output device; and a second color space converting step of converting the second XYZ data into image data in the RGB colorimetric system.

In addition, variants that are grasped by referring to the embodiment and the drawings in the sixteenth aspect of the present invention are considered to be means for solving the problems.

Effects of the Invention

According to the first aspect of the present invention, image data representing colors within a color reproduction range that is wider than a color reproduction range of an output device is supplied externally to an image processing device. Image data in an RGB colorimetric system obtained based on the image data supplied externally (hereinafter referred to as "RGB data") is converted into image data in an XYZ colorimetric system (hereinafter referred to as "XYZ data"), and the conversion processing is performed to tristimulus values X, Y, and Z of the XYZ data. Here, unlike in the RGB colorimetric system, the tristimulus values may not take a negative value in the XYZ colorimetric system, and the tristimulus values in the XYZ colorimetric system do not depend upon the device. Therefore, when it is desired to display a color different from a color represented by the externally supplied image data in an output device (for example, a liquid crystal panel), it is possible to facilitate the conversion processing to data without requiring complicated arithmetic processing as compared to the conversion processing to data in the RGB colorimetric system. Further, as the color represented by the externally supplied image data is converted into a color within the color reproduction range of the output device, it is possible to reflect continuity in the color for the data of the extended color to an image that is displayed.

According to the second aspect of the present invention, in the conversion processing, the image data is classified into four color data (first, second, third, and fourth color data). Further, the first color data is displayed in a color accurate to the color represented by the inputted data. Therefore, by providing the first boundary line so as to include memory colors such as white color and flesh color, it is possible to display memory colors in colors accurate to the colors represented by the inputted data. Moreover, for the second color data, a color reproduction range obtained based on data after the conversion processing is wider than a color reproduction range obtained based on data before the conversion processing. Therefore, a color based on a predetermined standard can be clearly displayed taking advantage of the color reproduction performance of the panel. Furthermore, the conversion is performed to the data values such that, for the third color data, a color within the color reproduction range of the output device is displayed, and for the fourth color data, a color having a chromaticity coordinate point along an outermost outline of the color reproduction range of the output device is displayed. Therefore, not all of the data of the extended colors are clipped, and the color out of the extended colors that is considered to be relatively important is displayed such that continuity in the color may not deteriorate. Thus it is possible to clearly display an image taking advantage of the color reproduction performance of the panel while ensuring the color to be displayed based on the data of the extended color when the inputted data including the data of the extended color is externally supplied.

According to the third aspect of the present invention, for the second color data and the third color data, the conversion processing is performed while considering a relation between the color reproduction ranges before and after the conversion and chromaticity coordinates for the inputted data. Therefore, without losing a balance between colors of an entire image in the xy chromaticity diagram, the color based on the predetermined standard can be clearly displayed taking advantage of the color reproduction performance of the panel, and the color out of the extended colors that is considered to be relatively important is displayed such that continuity in the color may not deteriorate.

According to the fourth aspect of the present invention, for the second color data and the third color data, the conversion processing is performed while considering relations between the color reproduction ranges before and after the conversion and chromaticity coordinates for the inputted data. At this time, the chromaticity coordinate of the data after the conversion processing is obtained using a first factor which is a function of a factor (basic factor) determined according to a chromaticity coordinate of the data of each of the pixels included in inputted data. Accordingly, by adopting a configuration such that the first factor is obtained considering such as human visual features, it is possible to obtain the same effect as that of the third aspect without providing a viewer of an image with a feeling of strangeness.

According to the fifth aspect of the present invention, by determining q to be an adequate value, the color based on the predetermined standard can be clearly displayed taking advantage of the color reproduction performance of the panel, and the color out of the extended colors that is considered to be relatively important is displayed such that continuity in the color may not deteriorate, while reducing a feeling of strangeness provided for a viewer of an image.

According to the sixth aspect of the present invention, as the first factor used for data conversion processing is acquired from the look-up table, arithmetic processing for obtaining the first factor is not necessary, and thus the implementation is facilitated.

According to the seventh aspect of the present invention, brightness of the data after the conversion processing is obtained while considering a relation between maximum brightness at the chromaticity coordinates of the inputted data and maximum brightness at the chromaticity coordinates of the data after the conversion processing. Therefore, a balance in brightness of an entire image in the xyY color space may not be lost.

According to the eighth aspect of the present invention, brightness of the data after the conversion processing is obtained while considering a relation between maximum brightness at the chromaticity coordinates of the inputted data and maximum brightness at the chromaticity coordinates of the data after the conversion processing. At this time, a second factor which is a function of a factor (basic factor) determined according to a chromaticity coordinate of each of the pixels included in inputted data is used. Therefore, by adopting a configuration such that the second factor is obtained considering such as human visual features, the color based on the predetermined standard can be displayed using a color of brightness higher than the maximum brightness obtained by the inputted data, and the color out of the extended colors that is considered to be relatively important is displayed such that continuity of brightness in the color may not deteriorate, without providing a viewer of an image with a feeling of strangeness.

According to the ninth aspect of the present invention, by determining r to be an adequate value, the color based on the predetermined standard can be displayed using a color of brightness higher than the maximum brightness obtained by the inputted data, and the color out of the extended colors that is considered to be relatively important is displayed such that continuity of brightness in the color may not deteriorate while reducing a feeling of strangeness provided for a viewer of an image.

According to the tenth aspect of the present invention, as the second factor used for data conversion processing is acquired from the look-up table, arithmetic processing for obtaining the second factor is not necessary, and thus the implementation is facilitated.

According to the eleventh aspect of the present invention, for data for D65 which is a standard light source, the tristimulus values X, Y, and Z in the XYZ colorimetric system do not vary between before and after the conversion processing. Therefore, an accurate display is performed for reference white color. With this, it is possible to suppress a feeling of strangeness provided for a viewer of an image due to the conversion processing performed to color data.

According to the twelfth aspect of the present invention, for data for the memory colors, the tristimulus values X, Y, and Z in the XYZ colorimetric system do not vary between before and after the conversion processing. Therefore, it is possible to display colors accurate to colors represented by the inputted data for memory colors. With this, when the inputted data including the data of the extended color is externally supplied, it is possible to clearly display an image taking advantage of the color reproduction performance of the panel while suppressing a feeling of strangeness provided for a viewer of an image and while ensuring the color to be displayed based on the data of the extended color.

According to the thirteenth aspect of the present invention, it is possible to obtain the same effect as that of the first aspect of the present invention in an image processing device to which data complying with an xvYCC standard is supplied as the inputted data.

According to the fourteenth aspect of the present invention, it is possible to obtain the same effect as that of the first aspect of the present invention in an image processing device to which image data in a YCbCr colorimetric system is supplied as the inputted data.

According to the fifteenth aspect of the present invention, it is possible to provide the display device including the image processing device providing the same effect as that of the first aspect of the present invention.

BRIEF DESCRIPTION OF THE DRAWINGS

FIG. 3 is a table for showing chromaticity coordinate values of primary colors in an xvYCC standard and chromaticity coordinate values of primary colors of a liquid crystal panel that constitutes the display device according to the embodiment.

FIG. 12 is a table illustrating one example of a look-up table in the modified example according to the embodiment.

FIG. 17 is an xy chromaticity diagram for illustration of the color reproduction range in the xvYCC standard.

MODE FOR CARRYING OUT THE INVENTION

An embodiment of the present invention will be now described with reference to the drawings.

<1. Overview of Processing>

First, an approach for image processing according to this embodiment will be described. In this embodiment, RGB data complying with an xvYCC standard (image data in an RGB colorimetric system) is supplied externally to an image processing device as inputted data (an inputted video signal). Then, the image processing device performs conversion from the RGB data complying with the xvYCC standard into RGB data for a liquid crystal panel. At this time, the RGB data is converted into XYZ data (image data in an XYZ colorimetric system), and tristimulus values X, Y, and Z of the XYZ data are subjected to conversion processing. When the conversion processing is performed to the tristimulus values X, Y, and Z, an xyY color space is utilized. An overview of the image processing utilizing the xyY color space according to this embodiment is described below. Here, the conversion between the RGB data and the XYZ data can be performed based on the IEC standard, and therefore a detailed description shall be omitted.

Figure 2:
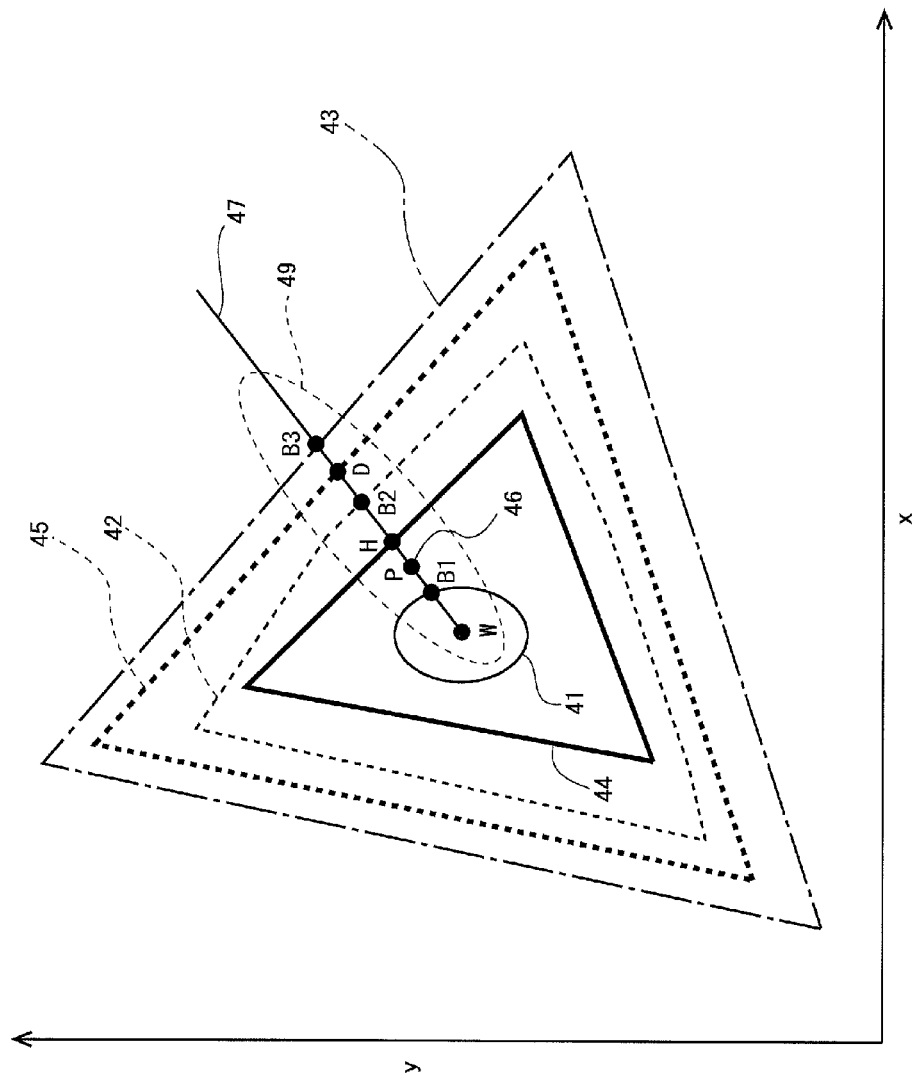
FIG. 2 is an xy chromaticity diagram for illustration of an overview of the image processing according to the embodiment.

FIG. 2 is an xy chromaticity diagram for illustration of an overview of the image processing according to this embodiment. In FIG. 2, a bold dotted line indicated by a reference numeral 45 represents (an outermost outline of) a color reproduction range of the liquid crystal panel used in this embodiment, and a bold solid line indicated by a reference numeral 44 represents (an outermost outline of) a color reproduction range based on an HDTV standard. As can be seen from FIG. 2, the color reproduction range 45 of the liquid crystal panel is wider than the color reproduction range 44 based on the HDTV standard. According to this embodiment, a color outside the color reproduction range 44 based on the HDTV standard, that is, the inputted data (the inputted video signal) including the data of the extended color described above is externally supplied to the image processing device.

According to this embodiment, three boundary lines (a first boundary line, a second boundary line, and a third boundary line) as represented by the reference numerals 41, 42, and 43 in FIG. 2 are provided imaginarily in the xy chromaticity diagram. The first boundary line 41, the second boundary line 42, and the third boundary line 43 each pass at least three points, defining a closed region. The first boundary line 41 is provided inside the outermost outline of the color reproduction range 44 based on the HDTV standard. The second boundary line 42 is provided outside the outermost outline of the color reproduction range 44 based on the HDTV standard and inside the outermost outline of the color reproduction range 45 of the liquid crystal panel. The third boundary line 43 is provided outside the outermost outline of the color reproduction range 45 of the liquid crystal panel. It should be noted that, according to this embodiment, the first boundary line 41 is provided so as to include memory colors and D65 (a reference white color) inside (of the boundary line).

Colors of pixels included in the inputted video signal are categorized into four colors (a first color, a second color, a third color, and a fourth color) as described below. A color in the xy chromaticity diagram having a chromaticity coordinate within the first boundary line 41 is referred to as the first color. A color in the xy chromaticity diagram having a chromaticity coordinate outside the first boundary line 41 and within the outermost outline of the color reproduction range 44 based on the HDTV standard is referred to as the second color. A color in the xy chromaticity diagram having a chromaticity coordinate outside the outermost outline of the color reproduction range 44 based on the HDTV standard and within the third boundary line 43 is referred to as the third color. A color in the xy chromaticity diagram having a chromaticity coordinate outside the third boundary line 43 is referred to as the fourth color. In this case, the third color and the fourth color are the extended colors described previously.

Next, it is described how to determine which one of the four colors a color of a pixel included in the inputted video signal (hereinafter referred to as a "target pixel") is. Assuming that a position of the color of the target pixel in the xy chromaticity diagram is a point P, first, an equation for a straight line (straight line for conversion) 47 passing through a white point ("point W") and the point P is obtained. Then, chromaticity coordinates are obtained respectively for an intersection point between the straight line 47 and the first boundary line 41

("point B1"), an intersection point between the straight line 47 and the outermost outline of the color reproduction range 44 based on the HDTV standard ("point H"), an intersection point between the straight line 47 and the second boundary line 42 ("point B2"), an intersection point between the straight line 47 and the outermost outline of the color reproduction range 45 of the liquid crystal panel ("point D"), and an intersection point between the straight line 47 and the third boundary line 43 ("point B3"). Further, if the point P is between the point W and the point B1, the color of the target pixel is determined to be the first color; if the point P is between the point B1 and the point H, the color of the target pixel is determined to be the second color; if the point P is between the point H and the point B3, the color of the target pixel is determined to be the third color; and if the point P is at a position other than the above, the color of the target pixel is determined to be the fourth color. In the following, it is described how each of the first to the fourth color is converted.

In a case in which the color of the target pixel is the first color, the conversion processing is performed such that a color accurate to the color represented by the inputted video signal is displayed. Specifically, before and after the conversion processing, the value of the chromaticity coordinate in the xy chromaticity diagram does not change, and the value of the brightness in the xyY color space does not change as well.

In a case in which the color of the target pixel is the second color, a chromaticity coordinate of a point Q at which "a proportion of a length of a line segment B1P to a length of a line segment B1H" and "a proportion of a length of a line segment B1Q to a length of a line segment B1B2" become equal is obtained from chromaticity coordinates along the straight line 47. The chromaticity coordinate of the point Q thus obtained is taken as a chromaticity coordinate of the color of the target pixel after the conversion. Further, brightness of data after the conversion in the xyY color space is obtained such that "a proportion of a maximum value of brightness at the point Q to a maximum value of brightness at the point P" and "a proportion of the brightness of the data after the conversion to brightness represented by the inputted video signal" become equal.

In a case in which the color of the target pixel is the third color, a chromaticity coordinate of the point Q at which "a proportion of a length of a line segment HP to a length of a line segment HB3" and "a proportion of a length of a line segment B2Q to a length of a line segment B2D" become equal is obtained from chromaticity coordinates along the straight line 47. The chromaticity coordinate of the point Q thus obtained is taken as a chromaticity coordinate of the color of the target pixel after the conversion. Further, brightness of data after the conversion in the xyY color space is obtained such that "the proportion of the maximum value of the brightness at the point Q to the maximum value of the brightness at the point P" and "the proportion of the brightness of the data after the conversion to brightness represented by the inputted video signal" become equal.

In a case in which the color of the target pixel is the fourth color, the chromaticity coordinate of the intersection point between the straight line 47 and the outermost outline of the color reproduction range 45 of the liquid crystal panel, that is, the point D, is taken as a chromaticity coordinate of the color of the target pixel after the conversion. Further, brightness of data after the conversion in the xyY color space is obtained such that "the proportion of the maximum value of the brightness at the point Q to the maximum value of the brightness at the point P" and "the proportion of the brightness of the data after the conversion to brightness represented by the inputted video signal" become equal.

It should be noted that, according to this embodiment, the point P corresponds to a first coordinate, the point B1 corresponds to a second coordinate, the point H corresponds to a third coordinate, the point B2 corresponds to a fourth coordinate, the point D corresponds to a fifth coordinate, the point B3 corresponds to a sixth coordinate, and the point Q corresponds to a seventh coordinate.

<2. Overview of Configuration and Operation of Display Device>

Figure 1:
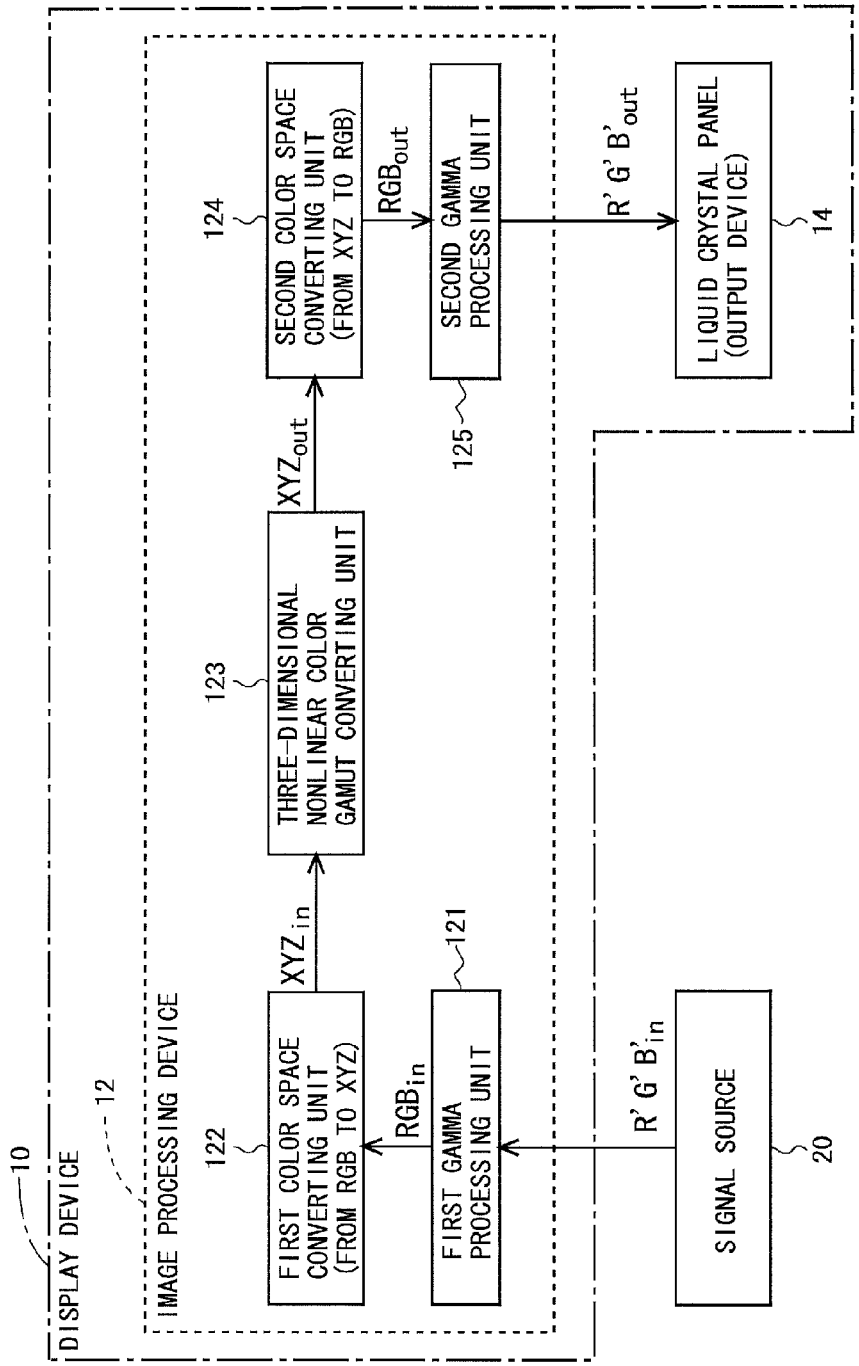
FIG. 1 is a block diagram illustrating a schematic configuration of a display device according to an embodiment of the present invention.
Figures 14, 15:
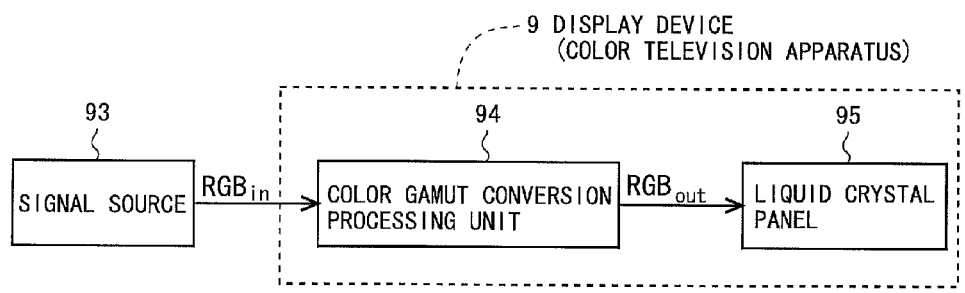
FIG. 14 is a table for showing chromaticity coordinate values of primary colors in an HDTV standard and chromaticity coordinate values of primary colors of one liquid crystal panel that constitutes a display device.
FIG. 15 is a block diagram illustrating an example of a configuration of a display device according to the conventional example.
Figure 16:
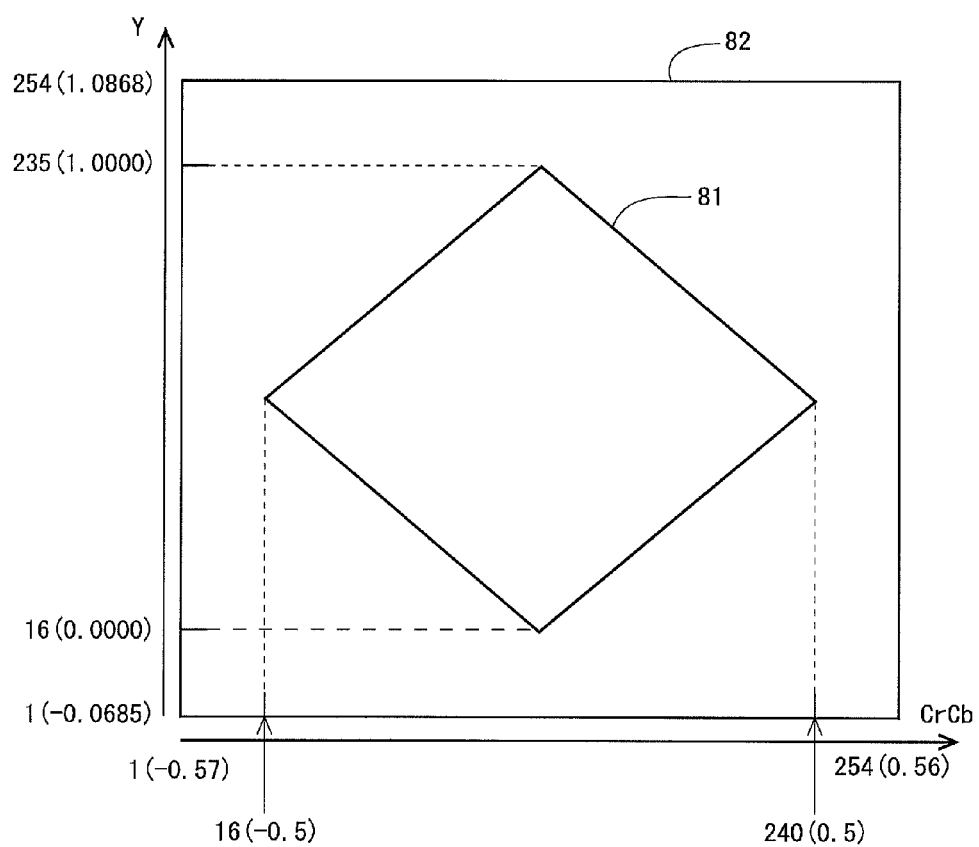
FIG. 16 is a diagram for illustration of a color reproduction range in the xvYCC standard.

FIG. 1 is a block diagram illustrating a schematic configuration of a display device according to the embodiment of the present invention. As shown in FIG. 1, this display device 10 is configured by an image processing device 12 and a liquid crystal panel 14. The image processing device 12 serves to convert an RGB signal $R'G'B'_{in}$, which is supplied from an external signal source 20 and complies with the xvYCC standard, into an RGB signal $R'G'B'_{out}$ for the liquid crystal panel 14. The liquid crystal panel 14 displays an image in a display unit (not depicted) by applying a voltage based on the RGB signal $R'G'B'_{out}$ supplied from the image processing device 12 to a liquid crystal layer. It should be noted that chromaticity coordinate values of the primary colors in the xvYCC standard are as indicated by a reference numeral 31 in FIG. 3, and chromaticity coordinate values of the primary colors of the liquid crystal panel 14 used in this embodiment are as indicated by a reference numeral 32 in FIG. 3. As can be seen from FIGS. 3 and 14, the chromaticity coordinate values of the primary colors in the xvYCC standard and chromaticity coordinate values of the primary colors in the HDTV standard are identical.

The image processing device 12 includes, as shown in FIG. 1, a first gamma processing unit 121, a first color space converting unit 122, a three-dimensional nonlinear color gamut converting unit 123, a second color space converting unit 124, and a second gamma processing unit 125. The first gamma processing unit 121 is configured to perform a known gamma process to the RGB signal $R'G'B'_{in}$ complying with the xvYCC standard and transmitted from the external source 20 to generate a linear RGB signal $RGB_{in}$. Here, in the gamma process performed by the first gamma processing unit 121, a gamma value is typically taken as (1/2.2). The first color space converting unit 122 converts the RGB signal $RGB_{in}$ generated by the first gamma processing unit 121 into an XYZ signal $XYZ_{in}$ as first XYZ data based on the equation (1). Specifically, the first color space converting unit 122 performs data conversion from an RGB color space to the XYZ color space. The XYZ signal $XYZ_{in}$ obtained through the conversion processing by the first color space converting unit 122 is supplied to the three-dimensional nonlinear color gamut converting unit 123. The three-dimensional nonlinear color gamut converting unit 123 performs predetermined conversion processing to the XYZ signal $XYZ_{in}$ to generate an XYZ signal $XYZ_{out}$ as second XYZ data to be supplied to the second color space converting unit 124. The processing performed by the three-dimensional nonlinear color gamut converting unit 123 will be later described in detail. The second color space converting unit 124 converts the XYZ signal $XYZ_{out}$ into the linear RGB signal $RGB_{out}$ based on an equation (4) listed below obtained by the equation (2).

$$\begin{pmatrix} R \\ G \\ B \end{pmatrix}_{out} = \begin{pmatrix} 3.1419 & -1.3448 & -0.5004 \\ -0.9463 & 1.8661 & 0.0516 \\ 0.0289 & -0.1008 & 0.6643 \end{pmatrix} \begin{pmatrix} X \\ Y \\ Z \end{pmatrix} \quad (4)$$

Specifically, the second color space converting unit 124 performs data conversion from the XYZ color space to the RGB color space. The second gamma processing unit 125 is configured to perform a known gamma process to the linear RGB signal $RGB_{out}$ generated by the second color space converting unit 124 to generate the nonlinear RGB signal R' G' B'$_{out}$. Here, in the gamma process performed by the second gamma processing unit 125, a gamma value is typically taken as 2.2. The RGB signal R'G'B'$_{out}$ generated by the second gamma processing unit 125 is supplied to the liquid crystal panel 14. Then, an image is displayed in the liquid crystal panel 14 based on the RGB signal R'G' B'$_{out}$ as described above.

It should be noted that according to this embodiment, an XYZ data converting unit is realized by the three-dimensional nonlinear color gamut converting unit 123, and an output device is realized by the liquid crystal panel 14. Further, in the following description, data in the xyY colorimetric system corresponding to the XYZ signal $XYZ_{in}$ inputted into the three-dimensional nonlinear color gamut converting unit 123 is represented by reference symbols x, y, and Y, and data in the xyY colorimetric system corresponding to the XYZ signal $XYZ_{out}$ outputted from the three-dimensional nonlinear color gamut converting unit 123 is represented by reference symbols $x_1$, $y_1$, and $Y_1$.

<3. Processing by Three-dimensional Nonlinear Color Gamut Converting Unit>

Figure 4:
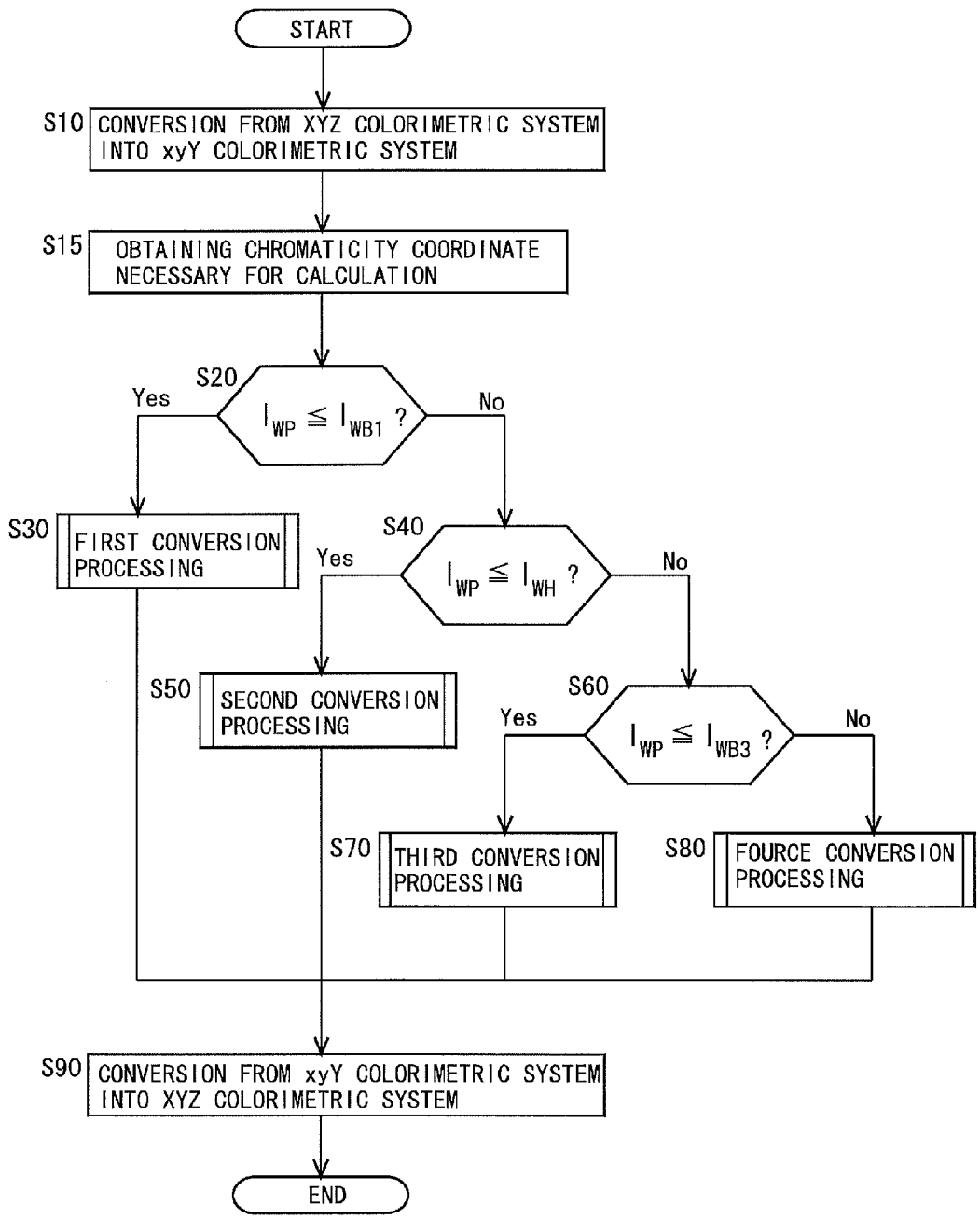
FIG. 4 is a flowchart showing an overview of a sequence of conversion processing performed by a three-dimensional nonlinear color gamut converting unit according to the embodiment.

Next, the processing by the three-dimensional nonlinear color gamut converting unit 123 is described with reference to FIGS. 4 through 10. FIG. 4 is a flowchart showing an overview of a sequence of the conversion processing performed by the three-dimensional nonlinear color gamut converting unit 123. Here, FIG. 4 shows the overview of the process sequence when focusing on data of a single pixel (target pixel) included in the inputted video signal.

Figure 5:
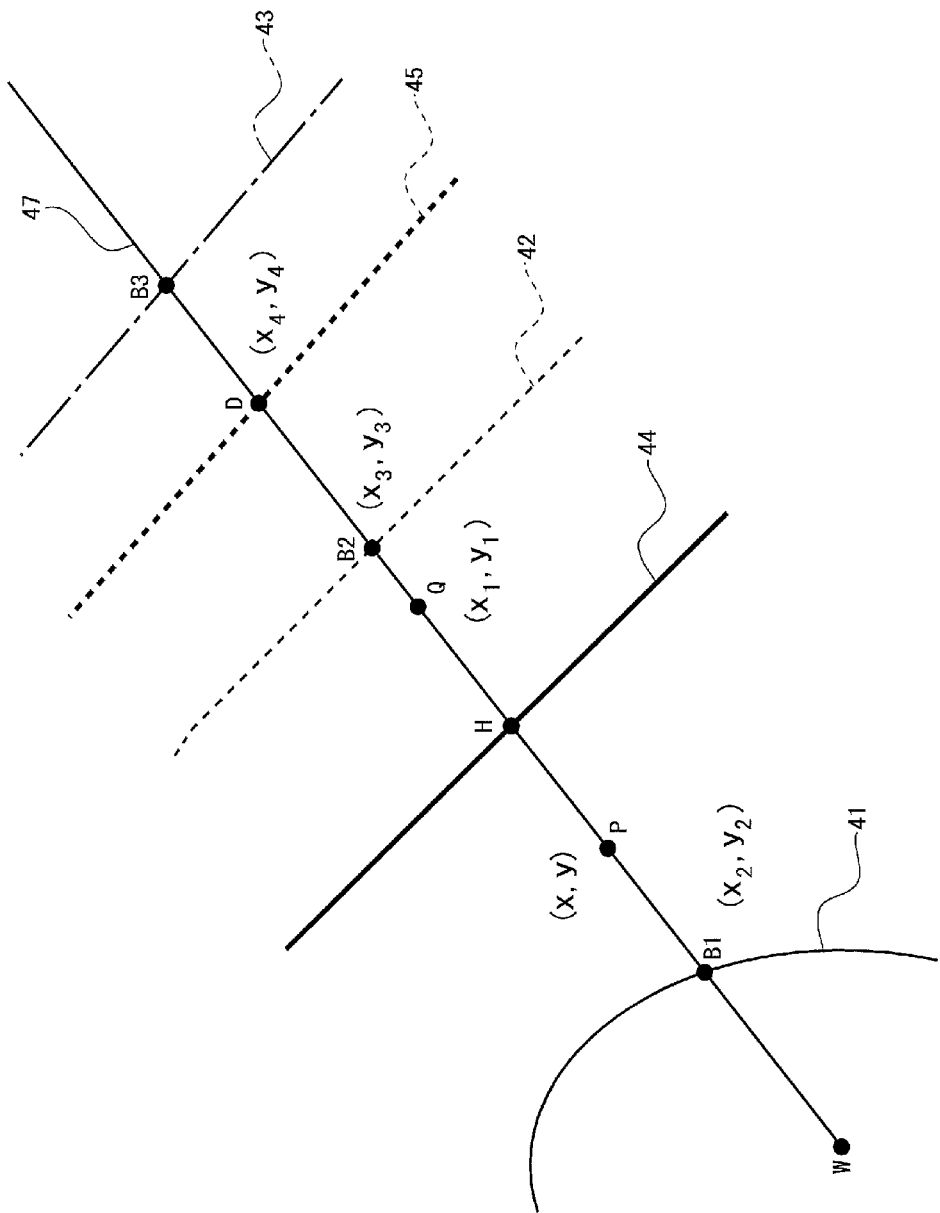
FIG. 5 is an enlarged view of a region indicated by a reference numeral 49 in FIG. 2.

FIG. 5 is an enlarged view of a region represented by a reference numeral 49 in FIG. 2. In the following description, as shown in FIG. 5, the chromaticity coordinate of the point P is represented by (x, y), the chromaticity coordinate of the point Q to be obtained through the conversion processing is represented by ($x_1$, $y_1$), the chromaticity coordinate of the point B1 is represented by ($x_2$, $y_2$), the chromaticity coordinate of the point B2 is represented by ($x_3$, $y_3$), and the chromaticity coordinate of the point D is represented by ($x_4$, $y_4$).

First, the three-dimensional nonlinear color gamut converting unit 123 receives the XYZ signal $XYZ_{in}$ obtained through the conversion processing by the first color space converting unit 122, and performs data conversion from the XYZ colorimetric system to the xyY calorimetric system (step S10 in FIG. 4). The conversion from the XYZ colorimetric system to the xyY colorimetric system is performed based on equations (5) and (6) listed below.

$$x=X/(X+Y+Z) \quad (5)$$

$$y=Y/(X+Y+Z) \quad (6)$$

For the brightness Y, the value of Y in the XYZ colorimetric system is taken without any change as the value of Y in the xyY colorimetric system. In this manner, the value of the chromaticity coordinate (x, y) in the xy chromaticity diagram and the value of the brightness Y are obtained for the color of the target pixel. It should be noted that in the following description, the point P, that is, the chromaticity coordinate point of the color of the target pixel in the xy chromaticity diagram, is also referred to as an "input data chromaticity coordinate point". Further, FIG. 5 shows an example in which the input data chromaticity coordinate point (point P) is present outside the first boundary line 41 and within the outermost outline of the color reproduction range 44 based on the HDTV standard.

Next, the three-dimensional nonlinear color gamut converting unit 123 obtains the chromaticity coordinates of the point B1, the point H, the point B2, the point D, and the point B3 (step S15). To be more specific, the three-dimensional nonlinear color gamut converting unit 123 first obtains the equation representing the straight line 47 passing through the white point (point W) and the point P. Then, the three-dimensional nonlinear color gamut converting unit 123 obtains the chromaticity coordinate of the point B1 based on the equation representing the straight line 47 and on the equation representing the first boundary line 41, the chromaticity coordinate of the point H based on the equation representing the straight line 47 and on the equation representing the outermost outline of the color reproduction range 44 based on the HDTV standard, the chromaticity coordinate of the point B2 based on the equation representing the straight line 47 and on the equation representing the second boundary line 42, the chromaticity coordinate of the point D based on the equation representing the straight line 47 and on the equation representing the outermost outline of the color reproduction range 45 of the liquid crystal panel 14, and the chromaticity coordinate of the point B3 based on the equation representing the straight line 47 and on the equation representing the third boundary line 43.

Next, the three-dimensional nonlinear color gamut converting unit 123 determines whether or not a length $l_{WP}$ of a line segment WP is not longer than a length $l_{WB1}$ of a line segment WB1 (step S20). To be more specific, the three-dimensional nonlinear color gamut converting unit 123 obtains the length $l_{WP}$ of the line segment WP based on the chromaticity coordinate of the point W and the chromaticity coordinate of the point P, and obtains the length $l_{WB1}$ of the line segment WB1 based on the chromaticity coordinate of the point W and the chromaticity coordinate of the point B1. Based on $l_{WP}$ and $l_{WB1}$ thus obtained, the three-dimensional nonlinear color gamut converting unit 123 determines whether or not $l_{WP}$ is not longer than $l_{WB1}$. As a result of the determination, if $l_{WP}$ is not longer than $l_{WB1}$, the process proceeds to step S30, and if $l_{WP}$ is longer than $l_{WB1}$, the process proceeds to step S40. It should be noted that when it is determined that $l_{WP}$ is not longer than $l_{WB1}$ in step S20, the color of the target pixel is the first color.

Figure 6:
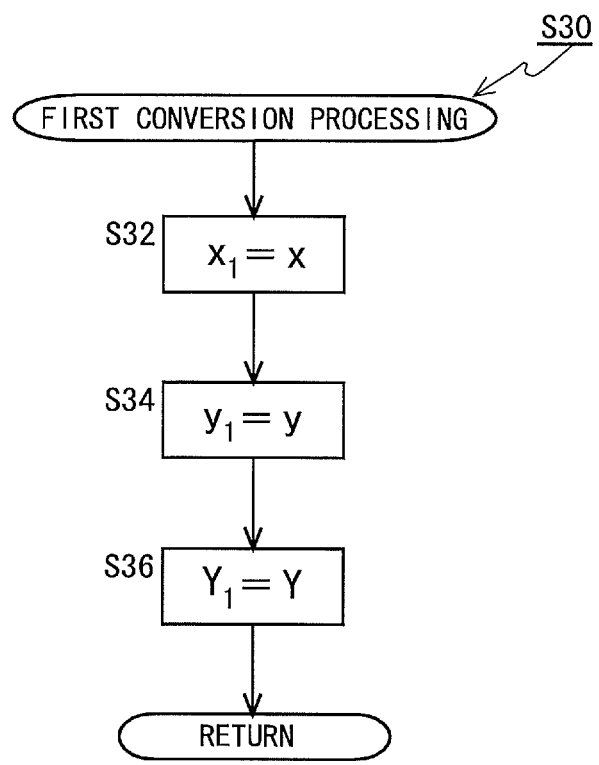
FIG. 6 is a flowchart showing a sequence of first conversion processing according to the embodiment.

In step S30, first conversion processing described below is performed by the three-dimensional nonlinear color gamut converting unit 123. FIG. 6 is a flowchart showing a sequence of the first conversion processing. In step S32, the three-dimensional nonlinear color gamut converting unit 123 sets the value of $x_1$ to be x. In step S34, the three-dimensional nonlinear color gamut converting unit 123 sets the value of $y_1$ to be y. In step S36, the three-dimensional nonlinear color gamut converting unit 123 sets the value of $Y_1$ to be Y. After completing step S36, the process proceeds to step S90 in FIG. 4.

In step S40, the three-dimensional nonlinear color gamut converting unit 123 determines whether or not the length $l_{WP}$ of the line segment WP is not longer than a length $l_{WH}$ of a line segment WH. To be more specific, the three-dimensional nonlinear color gamut converting unit 123 first obtains the length $l_{WH}$ of the line segment WH based on the chromaticity coordinate of the point W and the chromaticity coordinate of the point H. Based on $l_{WH}$ thus obtained and $l_{WP}$ obtained in step S20, the three-dimensional nonlinear color gamut converting unit 123 determines whether or not $l_{WP}$ is not longer than $l_{WH}$. As a result of the determination, if $l_{WP}$ is not longer than $l_{WH}$, the process proceeds to step S50, and if $l_{WP}$ is longer than $l_{WH}$, the process proceeds to step S60. It should be noted that when it is determined that $l_{WP}$ is not longer than $l_{WH}$ in step S40, the color of the target pixel is the second color.

Figure 7:
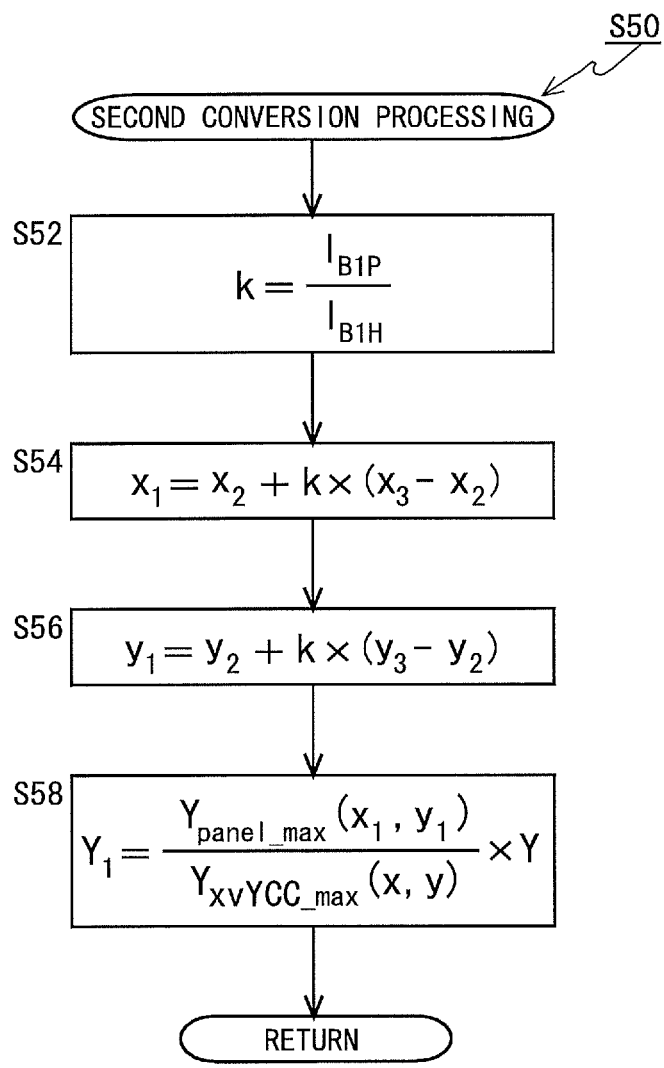
FIG. 7 is a flowchart showing a sequence of second conversion processing according to the embodiment.

In step S50, second conversion processing described below is performed by the three-dimensional nonlinear color gamut converting unit 123. FIG. 7 is a flowchart showing a sequence of the second conversion processing. In step S52, the three-dimensional nonlinear color gamut converting unit 123 obtains a ratio of a length of a line segment B1P to the length of the line segment B1H as a factor (basic factor) k for using in a step that will be described later. To be more specific, the three-dimensional nonlinear color gamut converting unit 123 obtains the length $l_{B1H}$ of the line segment B1H based on the chromaticity coordinate of the point B1 and the chromaticity coordinate of the point H, and obtains a length $l_{B1P}$ of the line segment B1P based on the chromaticity coordinate of the point B1 and the chromaticity coordinate of the point P. Then, the three-dimensional nonlinear color gamut converting unit 123 obtains the factor k by dividing $l_{B1P}$ by $l_{B1H}$, as shown by an equation (7) listed below.

$$k = l_{B1P}/l_{B1H} \tag{7}$$

In step S54, the three-dimensional nonlinear color gamut converting unit 123 obtains the value of $x_1$ based on an equation (8) listed below.

$$x_1 = x_2 + k \times (x_3 - x_2) \tag{8}$$

In step S56, the three-dimensional nonlinear color gamut converting unit 123 obtains the value of $y_1$ based on an equation (9) listed below.

$$y_1 = y_2 + k \times (y_3 - y_2) \tag{9}$$

In step S58, the three-dimensional nonlinear color gamut converting unit 123 obtains the value of $Y_1$ based on an equation (10) listed below. It should be noted that, $Y_{xvYCC\_max}(x, y)$ is a maximum value of brightness at the chromaticity coordinate $(x, y)$, and $Y_{panel\_max}(x_1, y_1)$ is a maximum value of brightness at the chromaticity coordinate $(x_1, y_1)$.

$$Y_1 = \frac{Y_{panel\_max}(x_1, y_1)}{Y_{HDTV\_max}(x, y)} \times Y \tag{10}$$

After completing step S58, the process proceeds to step S90 in FIG. 4.

Figure 10:
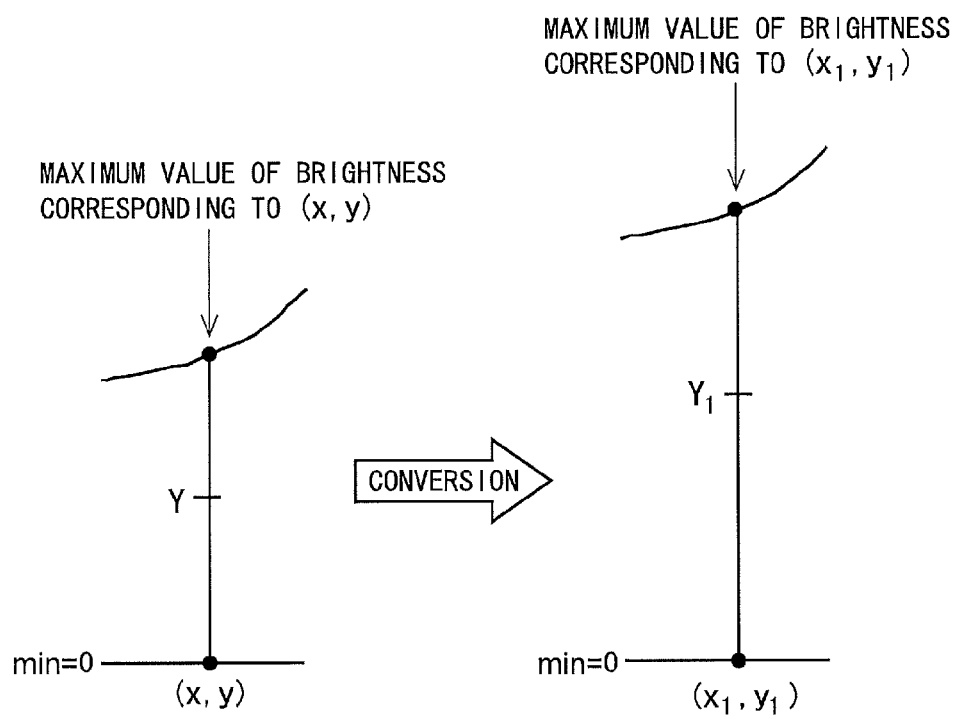
FIG. 10 is a diagram for illustration of brightness conversion according to the embodiment.

Here, the equation (10) will be described with reference to FIG. 10. In the xyY color space, the maximum value of the brightness Y varies depending on the value of the chromaticity coordinate (x, y) in the xy chromaticity diagram. Specifically, the maximum value of the brightness corresponding to the point P and the maximum value of the brightness corresponding to the point Q are different. Accordingly, in this embodiment, the brightness of the color of the target pixel is converted from Y to $Y_1$ such that an increase rate in the brightness becomes identical with an increase rate of the maximum value of the brightness along with the conversion of the chromaticity coordinate of the color of the target pixel in the xy chromaticity diagram. For example, when the maximum value of the brightness corresponding to the point P is 3, and when the maximum value of the brightness corresponding to the point Q is 3.3, the brightness $Y_1$ after the conversion for the color of the target pixel is about 1.1 times higher than the brightness Y before the conversion. This also applies to third conversion processing and fourth conversion processing that will be later described.

In step S60, the three-dimensional nonlinear color gamut converting unit 123 determines whether or not the length $l_{WP}$ of the line segment WP is not longer than a length $l_{WB3}$ of a line segment WB3. To be more specific, the three-dimensional nonlinear color gamut converting unit 123 obtains the length $l_{WB3}$ of the line segment WB3 based on the chromaticity coordinate of the point W and the chromaticity coordinate of the point B3. Based on $l_{WB3}$ thus obtained and $l_{WP}$ obtained in step S20, the three-dimensional nonlinear color gamut converting unit 123 determines whether or not $l_{WP}$ is not longer than $l_{WB3}$. As a result of the determination, if $l_{WP}$ is not longer than $l_{WB3}$, the process proceeds to step S70, and if $l_{WP}$ is longer than $l_{WB3}$, the process proceeds to step S80. It should be noted that when it is determined that $l_{WP}$ is not longer than $l_{WB3}$ in step S60, the color of the target pixel is the third color. Further, when it is determined that $l_{WP}$ is longer than $l_{WB3}$ in step S60, the color of the target pixel is the fourth color.

Figure 8:
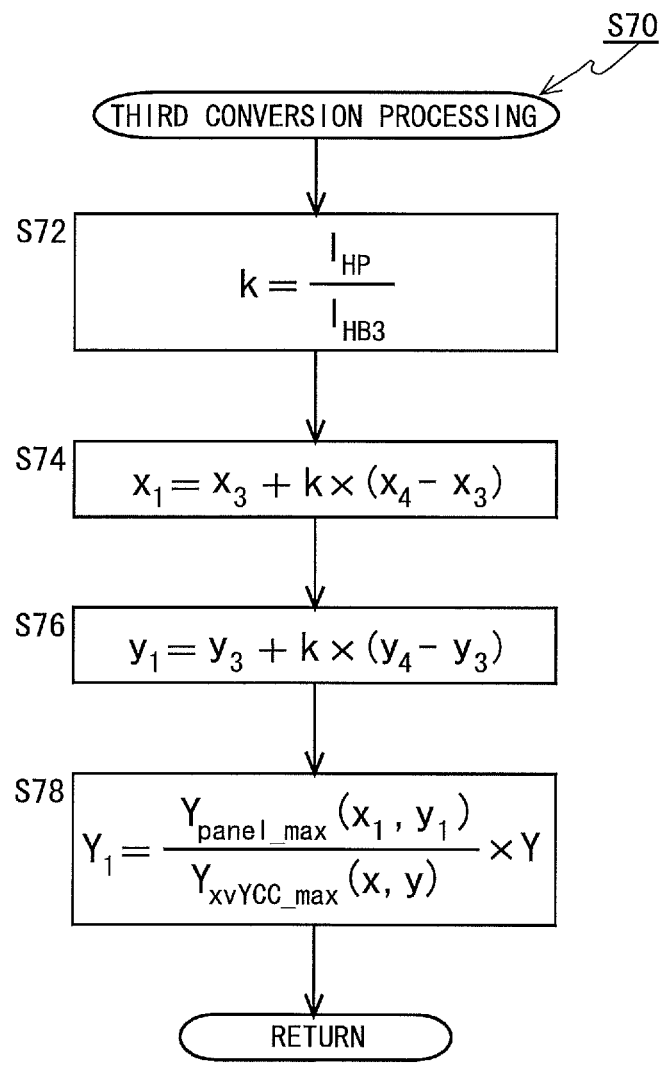
FIG. 8 is a flowchart showing a sequence of third conversion processing according to the embodiment.

In step S70, the third conversion processing described below is performed by the three-dimensional nonlinear color gamut converting unit 123. FIG. 8 is a flowchart showing a sequence of the third conversion processing. In step S72, the three-dimensional nonlinear color gamut converting unit 123 obtains the ratio of the length of the line segment HP to the length of the line segment HB3 as a factor k for using in a step that will be described later. To be more specific, the three-dimensional nonlinear color gamut converting unit 123 obtains the length $l_{HB3}$ of the line segment HB3 based on the chromaticity coordinate of the point H and the chromaticity coordinate of the point B3, and obtains the length $l_{HP}$ of the line segment HP based on the chromaticity coordinate of the point H and the chromaticity coordinate of the point P. Then, the three-dimensional nonlinear color gamut converting unit 123 obtains the factor k by dividing $l_{HP}$ by $l_{HB3}$ as shown by an equation (11) listed below.

$$k = l_{HP}/l_{HB3} \tag{11}$$

In step S74, the three-dimensional nonlinear color gamut converting unit 123 obtains the value of $x_1$ based on an equation (12) listed below.

$$x_1 = x_3 + k \times (x_4 - x_3) \tag{12}$$

In step S76, the three-dimensional nonlinear color gamut converting unit 123 obtains the value of $y_1$ based on an equation (13) listed below.

$$y_1 = y_3 + k \times (y_4 - y_3) \tag{13}$$

In step S78, similarly to the second conversion processing described above, the three-dimensional nonlinear color gamut converting unit 123 obtains the value of $Y_1$ based on the equation (10). After completing step S78, the process proceeds to step S90 in FIG. 4.

Figure 9:
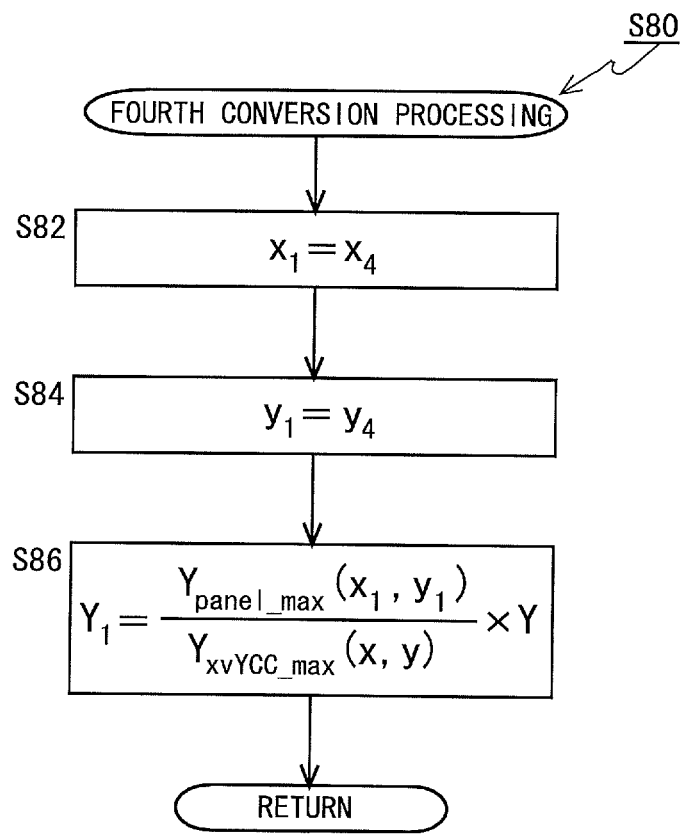
FIG. 9 is a flowchart showing a sequence of fourth conversion processing according to the embodiment.

In step S80, the fourth conversion processing described below is performed by the three-dimensional nonlinear color gamut converting unit 123. FIG. 9 is a flowchart showing a sequence of the fourth conversion processing. In step S82, the three-dimensional nonlinear color gamut converting unit 123 sets the value of $x_1$ to be $x_4$. In step S84, the three-dimensional nonlinear color gamut converting unit 123 sets the value of $y_1$ to be $y_4$. In step S86, similarly to the second conversion processing described above, the three-dimensional nonlinear color gamut converting unit 123 obtains the value of $Y_1$ based on the equation (10). After completing step S86, the process proceeds to step S90 in FIG. 4.

In step S90, the three-dimensional nonlinear color gamut converting unit 123 performs data conversion from the xyY colorimetric system to the XYZ colorimetric system based on the data values $x_1$, $y_1$, and $Y_1$ obtained through any of the first to the fourth conversion processing. The conversion from the xyY colorimetric system to the XYZ colorimetric system is performed based on equations (14) to (16) listed below.

$$S = Y_1/y_1 \qquad (14)$$

$$X_1 = x_1 \times S_1 \qquad (15)$$

$$Z_1 = (1 - x_1 - y_1) \times S \qquad (16)$$

It should be noted that the equations (14) to (16) are derived as relations of "(X/x)=(Y/y)=(Z/z)" and "x+y+z=1" are established between the data in the XYZ colorimetric system and the data in the xyY colorimetric system.

When the tristimulus values $X_1$, $Y_1$, and $Z_1$ for the data in the XYZ colorimetric system are obtained in this manner, the conversion processing by the three-dimensional nonlinear color gamut converting unit 123 is terminated.

<4. Effects>

According to this embodiment, the conversion processing is performed to the color data through the four different approaches, depending on a positional relation between the chromaticity coordinate point (input data chromaticity coordinate point) of the color represented by the inputted video signal in the xy chromaticity diagram and the first boundary line 41, the outermost outline of the color reproduction range 44 based on the HDTV standard, and the third boundary line 43. To be more specific, when the input data chromaticity coordinate point is within the first boundary line 41, the input data chromaticity coordinate point and the chromaticity coordinate point of the data after the conversion are made identical. When the input data chromaticity coordinate point is outside the first boundary line 41 and within the outermost outline of the color reproduction range 44 based on the HDTV standard, the chromaticity coordinate point of the data after the conversion is determined such that "a positional relation among the first boundary line 41, the second boundary line 42, and the chromaticity coordinate point of the data after the conversion" and "a positional relation among the first boundary line 41, the outermost outline of the color reproduction range 44 based on the HDTV standard, and the input data chromaticity coordinate point" become the same. When the input data chromaticity coordinate point is outside the outermost outline of the color reproduction range 44 based on the HDTV standard and within the third boundary line 43, the chromaticity coordinate point in the xy chromaticity diagram for the data after the conversion is determined such that "a positional relation among the second boundary line 42, the outermost outline of the color reproduction range 45 of the liquid crystal panel 14, and the chromaticity coordinate point of the data after the conversion" and "a positional relation among the outermost outline of the color reproduction range 44 based on the HDTV standard, the third boundary line 43, and the input data chromaticity coordinate point" become the same. When the input data chromaticity coordinate point is outside the third boundary line 43, the chromaticity coordinate point along the outermost outline of the color reproduction range 45 of the liquid crystal panel 14 is determined to be the chromaticity coordinate point of the data after the conversion. Further, when the input data chromaticity coordinate point is outside the first boundary line 41, the brightness of the data after the conversion in the xyY color space is determined such that the proportion of the brightness of the data after the conversion to the brightness of the data before the conversion and the proportion of the maximum value of the brightness at the chromaticity coordinate point of the data after the conversion to the maximum value of the brightness at the input data chromaticity coordinate point become equal.

Thus, when the color of the target pixel is the first color, the conversion to the data values in the xyY color space is not performed, and a color accurate to the color represented by the inputted video signal is displayed in the display unit of the liquid crystal panel 14. Therefore, by providing the first boundary line 41 so as to include memory colors such as white color and flesh color, it is possible to display memory colors in colors accurate to the colors represented by the inputted video signal. Further, when the color of the target pixel is the second color, the conversion is performed to the data values in the xyY color space such that saturation and brightness are increased, and the color after the conversion is displayed in the display unit of the liquid crystal panel 14. Therefore, the color in the HDTV standard (however, the color having the chromaticity coordinate within the first boundary line 41 is excluded) is clearly displayed taking advantage of the color reproduction performance of the panel. Moreover, the conversion is performed to the data values in the xyY color space such that, when the color of the target pixel is the third color, a color having a chromaticity coordinate within a predetermined range near the outermost outline of the color reproduction range 45 of the liquid crystal panel 14 is displayed, and when the color of the target pixel is the fourth color, a color having a chromaticity coordinate along the outermost outline of the color reproduction range 45 of the liquid crystal panel 14 is displayed. Therefore, not all of the data of the extended colors are subjected to the clipping process, and the color out of the extended colors that is considered to be relatively important is displayed such that continuity in the color may not deteriorate. As described above, it is possible to clearly display an image taking full advantage of the color reproduction performance of the panel while ensuring the color to be displayed based on the data of the extended color when the inputted data including the data of the extended color is externally supplied.

Further, according to this embodiment, the conversion processing is performed to the tristimulus values X, Y, and Z of the data in the XYZ colorimetric system. Here, in the XYZ colorimetric system, unlike the RGB colorimetric system, the tristimulus values do not take negative values and are independent of a device. Therefore, when it is desired to display a color different from the color represented by the inputted video signal in the liquid crystal panel 14 as described above, it is possible to facilitate the conversion processing to the data without requiring complicated arithmetic processing as compared to the conversion processing to the data in the RGB colorimetric system.

<5. Modified Examples>

Modified examples of the embodiment will now be described.

<5.1 Modified Example for Externally Supplied Data>

In the embodiment described above, the example has been described in which the RGB data (image data in the RGB colorimetric system) is supplied externally as the data complying with the xvYCC standard. However, the present invention is not limited to this. The present invention can be applied also in a case in which YCbCr data (image data in a YCbCr colorimetric system) is supplied externally as the data complying with the xvYCC standard, for example.

Figure 11:
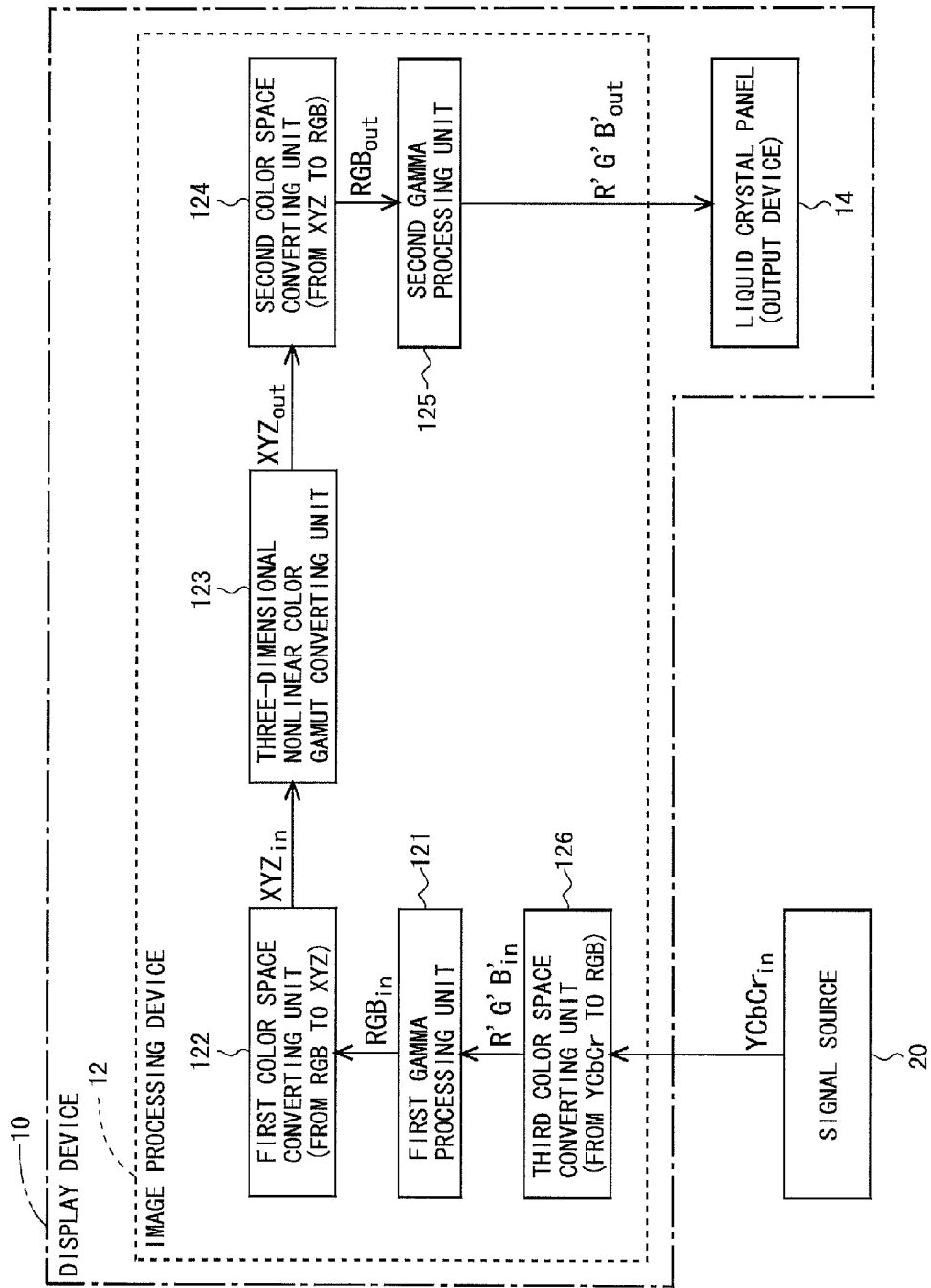
FIG. 11 is a block diagram illustrating a schematic configuration of a display device in a modified example according to the embodiment.

FIG. 11 is a block diagram illustrating a schematic configuration of a display device in this modified example. According to this modified example, the image processing device 12 is provided with a third color space converting unit 126, in addition to the components according to the embodiment. The third color space converting unit 126 converts a YCbCr signal $YCbCr_{in}$ complying with the xvYCC standard supplied from the external signal source 20 into the nonlinear RGB signal $R'G'B'_{in}$ based on an equation (17) listed below.

$$\begin{pmatrix} R' \\ G' \\ B' \end{pmatrix} = \begin{pmatrix} 1.0000 & 0.0000 & 1.5748 \\ 1.0000 & -0.1873 & -0.4681 \\ 1.0000 & 1.8556 & 0.0000 \end{pmatrix} \begin{pmatrix} Y \\ Cb \\ Cr \end{pmatrix} \quad (17)$$

Specifically, the third color space converting unit 126 performs data conversion from a YCbCr color space to the RGB color space. The RGB signal $R'G'B'_{in}$ generated by the third color space converting unit 126 is supplied to the first gamma processing unit 121. The components other than the third color space converting unit 126 perform the same processing as in the embodiment.

According to this modified example, similarly to the embodiment, it is possible to clearly display an image taking full advantage of the color reproduction performance of the panel while ensuring the color to be displayed based on the data of the extended color when image data in the YCbCr colorimetric system is externally supplied as the inputted data including the data of the extended color.

<5.2 Modified Example for Factor k Used in Conversion of Chromaticity Coordinate Value>

In the second conversion processing of the embodiment described above, k obtained by the equation (7), that is, k obtained by dividing $l_{B1P}$ by $l_{B1H}$, is used as the factor in the conversion of the chromaticity coordinate (x, y) in the xy chromaticity diagram (steps S54 and S56 of FIG. 7). However, the present invention is not limited to this. For example, it is possible to employ a configuration in which a function of k obtained by the equation (7) is used as the factor in the conversion of the chromaticity coordinate (x, y). Hereinafter, the function of k (basic factor) is referred to $k_1$ (first factor) for convenience sake.

According to this modified example, the three-dimensional nonlinear color gamut converting unit 123 obtains the value of $x_1$ based on an equation (18) listed below in step S54 described above instead of the equation (8), and obtains the value of $y_1$ based on an equation (19) listed below in step S56 described above instead of the equation (9).

$$x_1 = x_2 + k_{1 \times}(x_3 - x_2) \quad (18)$$

$$y_1 = y_2 + k_1 \times (y_3 - y_2) \quad (19)$$

In this case, the factor $k_1$ included in the equation (18) and the equation (19) may be obtained either by a linear equation or by a nonlinear equation. For example, if $k_1$ can be obtained by an equation (20) listed below, the same conversion processing as that in the embodiment described above is performed.

$$k_1 = k \quad (20)$$

Further, for example, $k_1$ may also be obtained by a nonlinear equation as shown by an equation (21) listed below. Here, q is a positive factor that can be determined to be any given value.

$$k_1 = 1 - e^{-kq} \quad (21)$$

By the configuration in which $k_1$ is obtained by the nonlinear equation as described above, it is possible to display an image taking advantage of the color reproduction performance of the panel while reducing a feeling of strangeness provided for a viewer. It should be noted that, as the factor $k_1$ should be determined based on such as human visual features, it is desirable to determine the factor $k_1$ based on, not limited to the equation (20) and the equation (21), such as statistical data relating to visual quality of an image.

In the meantime, regarding the configuration in which $k_1$ (first factor) as the function of k (basic factor) is used as the factor when converting the chromaticity coordinate, it is possible to store the factor $k_1$ in a previously prepared look-up table (first look-up table), and to acquire the factor $k_1$ from this look-up table by the three-dimensional nonlinear color gamut converting unit 123. This can be realized in a manner described below, for example. First, a number N of data pieces for the factor $k_1$ to be stored in the look-up table is determined. Then, an equation such as shown in an equation (22) listed below is determined as an equation for obtaining a value of the factor $k_1$. Here, i is an index used when the look-up table is referred, which is an integer that is not smaller than 0 and smaller than N.

$$k_1[i] = 1 - e^{-iq} \quad (22)$$

Next, in the equation (22), after a value for q is determined, an integer no smaller than 0 and smaller than N is sequentially substituted into the index i. With this, assuming that the number N of data pieces for the factor $k_1$ is "32", for example, a look-up table as shown in FIG. 12, for example, including 32 data pieces as factors $k_1[0] - k_1[31]$ is generated. The look-up table thus generated may be stored in the image processing device 12 and the look-up table may be configured to be referred to by the three-dimensional nonlinear color gamut converting unit 123.

The index i used when the look-up table is referred so that the three-dimensional nonlinear color gamut converting unit 123 acquires the value of the factor $k_1$ may be acquired, for example, by making a product of "k obtained in step S52 described above" and "the number N of data pieces for the factor $k_1$" to be an integer (e.g., a value obtained by rounding down to the nearest whole number). For example, if the value of k obtained in step S52 is "0.1", and if the number N of data pieces for the factor $k_1$ is "32", "3" that is obtained by rounding down "3.2" as a product of "0.1" and "32" to the nearest whole number is taken as the index i that is used when the look-up table is referred to by the three-dimensional nonlinear color gamut converting unit 123. However, if the value of k is "1", a product of "1" and "32" is "32" even though a maximum value of the index i is "31". Therefore, "31" is taken as the index i that is used when the look-up table is referred to by the three-dimensional nonlinear color gamut converting unit 123.

By providing the look-up table that stores values for the factor $k_1$ as described above, it is possible to eliminate the necessity for the three-dimensional nonlinear color gamut converting unit 123 to perform the arithmetic processing based on the nonlinear equation as expressed by the equation (21) during the operation of the display device 10, and thus to facilitate the implementation.

It should be noted that, also in the third conversion processing similarly to the second conversion processing, it is possible to employ a configuration in which the factor $k_1$ (first factor) as the function of k (basic factor) is used as the factor in the conversion of the chromaticity coordinate (x, y) (steps S74 and S76 in FIG. 8). Further, in this case, similarly to the second conversion processing, it is possible to store the factor $k_1$ in the previously prepared look-up table (first look-up table), and to acquire the factor $k_1$ from this look-up table by the three-dimensional nonlinear color gamut converting unit 123.

<5.3 Modified Example for Brightness Conversion>

According to the embodiment described above, in the second conversion processing, the brightness conversion in the xyY color space is performed based on the equation (10), that is, the brightness of the color of the target pixel is converted from Y to $Y_1$ such that the increase rate in the brightness becomes identical with the increase rate of the maximum value of the brightness along with the conversion of the chromaticity coordinate of the color of the target pixel in the xy chromaticity diagram. However, the present invention is not limited to this. For example, the conversion from Y to $Y_1$ may be performed based on an equation (23) listed below instead of the equation (10). Here, a factor $k_2$ (second factor) included in the equation (23) listed below is a function of k (basic factor) obtained by the equation (7).

$$Y_1 = \left[ (1 - K_2) + \frac{Y_{panel\_max}(x_1, y_1)}{Y_{xvYCC\_max}(x, y)} \times K_2 \right] \times Y \quad (23)$$

Regarding the equation (23), similarly to the factor $k_1$, the factor $k_2$ may be obtained either by a linear equation or by a nonlinear equation. For example, $k_2$ may be obtained by an equation (24) listed below.

$$k_2 = k \quad (24)$$

In the meantime, in the second conversion processing, as can be seen from FIG. 5 and the equation (7), the closer the input data chromaticity coordinate point is to the first boundary line 41, the closer the value of k is to "0", and the closer the input data chromaticity coordinate point is to the outermost outline of the color reproduction range 44 based on the HDTV standard, the closer the value of k is to "1". Accordingly, when the factor $k_2$ is obtained by the equation (24), the closer the input data chromaticity coordinate point is to the first boundary line 41, the closer the value of the factor $k_2$ is to "0", and the closer the input data chromaticity coordinate point is to the outermost outline of the color reproduction range 44 based on the HDTV standard, the closer the value of the factor $k_2$ is to "1". Therefore, as the input data chromaticity coordinate point is closer to the first boundary line 41, the conversion from Y to $Y_1$ is performed by giving a heavier weight to the value of Y representing the brightness in the xyY color space based on the inputted video signal. By contrast, as the input data chromaticity coordinate point is closer to the outermost outline of the color reproduction range 44 based on the HDTV standard, the conversion from Y to $Y_1$ is performed by giving a heavier weight to the increase rate of the maximum value of the brightness along with the conversion of the chromaticity coordinate. By employing the configuration in which the conversion from Y to $Y_1$ is performed based on the equation (23) in the second conversion processing as described above, the brightness conversion for the second color is performed with further considering human visual features.

Also in the third conversion processing, similarly to the second conversion processing, the conversion from Y to $Y_1$ may be performed based on the equation (23) instead of the equation (10).

In the meantime, in the third conversion processing, as can be seen from FIG. 5 and the equation (11), the closer the input data chromaticity coordinate point is to the outermost outline of the color reproduction range 44 based on the HDTV standard, the closer the value of k is to "0", and the closer the input data chromaticity coordinate point is to the third boundary line 43, the closer the value of k is to "1". Accordingly, when the factor $k_2$ is obtained by the equation (24), the closer the input data chromaticity coordinate point is to the outermost outline of the color reproduction range 44 based on the HDTV standard, the closer the value of the factor $k_2$ is to "0", and the closer the input data chromaticity coordinate point is to the third boundary line 43, the closer the value of the factor $k_2$ is to "1". Therefore, as the input data chromaticity coordinate point is closer to the outermost outline of the color reproduction range 44 based on the HDTV standard, the conversion from Y to $Y_1$ is performed by giving a heavier weight to the value of Y representing the brightness in the xyY color space based on the inputted video signal. By contrast, as the input data chromaticity coordinate point is closer to the third boundary line 43, the conversion from Y to $Y_1$ is performed by giving a heavier weight to the increase rate of the maximum value of the brightness along with the conversion of the chromaticity coordinate. By employing the configuration in which the conversion from Y to $Y_1$ is performed based on the equation (23) in the third conversion processing as described above, the brightness conversion for the third color is performed with further considering human visual features.

As can be seen from the above, according to this modified example, it is possible to display using colors of brightness higher than the maximum brightness obtained by the inputted video signal for the color based on the HDTV standard, and to display such that continuity of brightness in the color may not deteriorate for the color out of the extended colors that is considered to be relatively important, without providing a viewer of an image with a feeling of strangeness.

Further, similarly to the factor $k_1$ (first factor), the factor $k_2$ (second factor) may be obtained by a nonlinear equation as shown by an equation (25) listed below. Here, r is a positive factor that can be determined to be any given value.

$$k_2 = 1 - e^{-kr} \quad (25)$$

Moreover, similarly to the factor $k_1$ (first factor), it is possible to employ a configuration in which a look-up table (second look-up table) including data of the factor $k_2$ (second factor) is stored in the image processing device 12 and the factor $k_2$ is acquired from the look-up table by the three-dimensional nonlinear color gamut converting unit 123.

<5.4 Modified Example for First Boundary Line>

Figure 13:
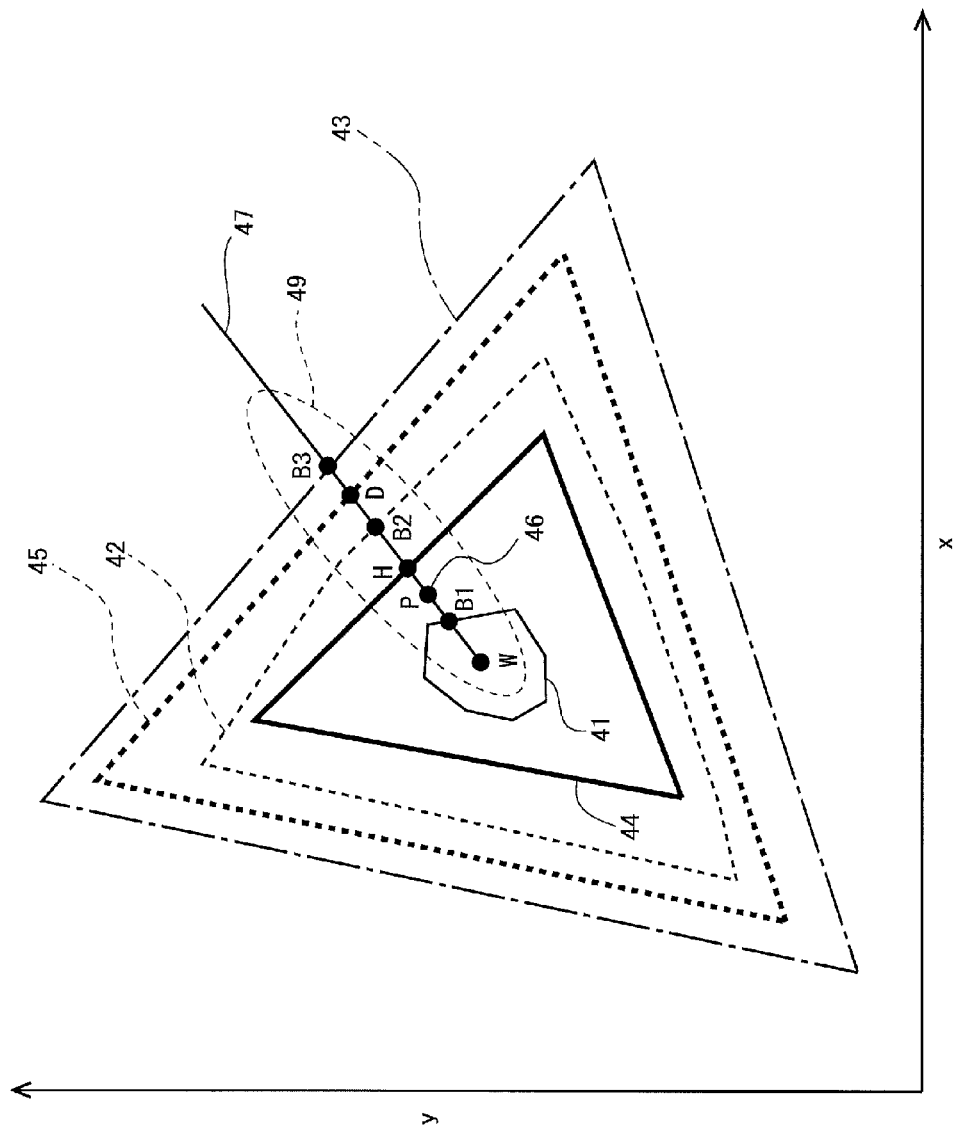
FIG. 13 is a diagram for illustration of a shape of a first boundary line in the modified example according to the embodiment.

In the embodiment described above, the shape of the first boundary line 41 in the xy chromaticity diagram is an elliptical shape (see FIG. 2). However, the present invention is not limited to this. The shape of the first boundary line 41 may be a polygonal shape as shown in FIG. 13, for example, as long as the shape can be represented by an equation on an xy plane. It should be noted that, as visual quality of images on the screen depends on tastes of the viewer, it is possible to acquire a number of pieces of statistical data relating to visual quality of images, for example, and to determine the shape of the first boundary line 41 based on the statistical data. The shape of the second boundary line 42 and the shape of the third boundary line 43 are also not limited to the shape according to the embodiment (see FIG. 2).

Further, in the embodiment, the chromaticity coordinates of the memory colors and D65 (reference white color) are included within the first boundary line 41. However, the present invention is not limited to this. For example, a chromaticity coordinate of a color to be displayed accurately to the inputted video signal other than the memory colors as well as the chromaticity coordinate of D65 may be included within the first boundary line 41, or, a chromaticity coordinate of a reference white color other than D65 (such as D93) may be included within the first boundary line 41.

DESCRIPTION OF REFERENCE CHARACTERS

10: DISPLAY DEVICE
12: IMAGE PROCESSING DEVICE
14: LIQUID CRYSTAL PANEL
20: SIGNAL SOURCE
41: FIRST BOUNDARY LINE
42: SECOND BOUNDARY LINE
43: THIRD BOUNDARY LINE
44: (OUTERMOST OUTLINE OF) COLOR REPRODUCTION RANGE BASED ON HDTV STANDARD
45: (OUTERMOST OUTLINE OF) COLOR REPRODUCTION RANGE OF LIQUID CRYSTAL PANEL
121: FIRST GAMMA PROCESSING UNIT
122: FIRST COLOR SPACE CONVERTING UNIT
123: THREE-DIMENSIONAL NONLINEAR COLOR GAMUT CONVERTING UNIT
124: SECOND COLOR SPACE CONVERTING UNIT
125: SECOND GAMMA PROCESSING UNIT
126: THIRD COLOR SPACE CONVERTING UNIT

The invention claimed is:

1. A display device, comprising:
a display panel configured to display an image; and
an image processing device configured to convert a color represented by inputted data into a color within a color reproduction range of a predetermined output device, the image processing device including,
a first color space converting unit configured to convert image data in an RGB colorimetric system obtained based on the inputted data into first XYZ data which is image data in an XYZ colorimetric system,
an XYZ data converting unit configured to generate second XYZ data which is image data in the XYZ colorimetric system by performing predetermined conversion processing to X, Y, and Z values as tristimulus values that constitute the first XYZ data, the second XYZ data representing the color within the color reproduction range of the output device, and
a second color space converting unit configured to convert the second XYZ data into image data in the RGB colorimetric system,
wherein, the display panel displays the image based on the data in the RGB colorimetric system generated by the second color space converting unit,
wherein, the display device is configured such that, to the first color space converting unit, image data representing a color within a color reproduction range wider than the color reproduction range of the output device is supplied as the inputted data, and
wherein, the display device is configured such that, the XYZ data converting unit,
categorizes the first XYZ data into first color data, second color data, third color data, and fourth color data, the first color data representing a color within a color reproduction range corresponding to a first boundary line provided in an xy chromaticity diagram, the second color data representing a color having a chromaticity coordinate outside the first boundary line in the xy chromaticity diagram and within a color reproduction range based on a predetermined standard that is compatible With a standard for the inputted data, the third color data representing a color outside the color reproduction range based on the predetermined standard and within a color reproduction range corresponding to a third boundary line provided in the xy chromaticity diagram so as to include the Color reproduction range of the output device, and the fourth color data representing a color having a chromaticity coordinate outside the third boundary line in the xy chromaticity diagram, and
performs the conversion processing to the X, Y, and Z values such that, for the first color data, a color represented by the first XYZ data is identical with a color presented by the second XYZ data, such that, for the second color data, the color reproduction range obtained by the second XYZ data is wider than the color reproduction range obtained by the first XYZ data, such that, for the third color data, the color represented by the second XYZ data has a chromaticity coordinate outside a second boundary line provided in the xy chromaticity diagram so as to include the color reproduction range based on the predetermined standard and is within the color reproduction range of the output device, and such that, for the fourth color data, the color represented by the second XYZ has a chromaticity coordinate along an outermost line expressing the color reproduction range of the output device in xy chromaticity diagram.

2. The display device according to claim 1, wherein the display device is configured such that,
when performing the conversion processing to data of each of pixels included in the first XYZ data, the XYZ data converting unit:
obtains a first coordinate, a second coordinate, a third coordinate, a fourth coordinate, a fifth coordinate, and a sixth coordinate in the xy chromaticity diagram, the first coordinate being a chromaticity coordinate for data of each of the pixels, the second coordinate being a chromaticity coordinate of an intersection point between a straight line for conversion and the first boundary line, the third coordinate being a Chromaticity coordinate of an intersection point between the straight line for conversion and an outermost line expressing the color reproduction range based on the predetermined standard, the fourth coordinate being a chromaticity coordinate of an intersection point between the straight line for conversion and the second boundary line, the fifth coordinate being a chromaticity coordinate of an intersection point between the straight line for conversion and an outermost line expressing the color reproduction range of the output device, and the sixth coordinate being a chromaticity coordinate of an intersection point between the straight line for conversion and the third boundary line, the straight line for conversion being a straight line passing through a predetermined reference coordinate and the first coordinate, and
obtains a seventh coordinate out of chromaticity coordinates along the straight line for conversion, where a chromaticity coordinate of data after the conversion processing has been performed to the data of each of the pixels is taken as the seventh coordinate, such that, for the first color data, the first coordinate is identical with the seventh coordinate, such that, for the second color data, a proportion of a distance between the second coordinate and the first coordinate to a distance between the second coordinate and the third coordinate is equal to a proportion of a distance between the second coordinate and the seventh coordinate to a distance between the second coordinate and the fourth coordinate, such that, for the third color data, a proportion of a distance between the third coordinate and the first coordinate to a distance between the third coordinate and the sixth coordinate is equal to a proportion of a distance between the fourth coordinate and the seventh coordinate to a distance between the fourth coordinate and the fifth coordinate, and such that, for the fourth color data, the fifth coordinate is identical with the seventh coordinate.

3. The display device according to claim 2, wherein the display device is configured such that,
the XYZ data converting unit obtains, when performing the conversion processing to the second color data, the third color data, and the fourth color data out of the data of each of the pixels included in the first XYZ data, a value of brightness for data of each of the pixels to be included in the second XYZ data such that a proportion of a maximum value of brightness at the seventh coordinate to a maximum value of brightness at the first coordinate is equal to a proportion of brightness for data after the conversion processing has been performed to the data of the corresponding pixel to brightness for the data of the corresponding pixel.

4. The display device according to claim 1, wherein the display device is configured such that,
when performing the conversion processing to data of each of pixels included in the first XYZ data, the XYZ data converting unit:
obtains a first coordinate, a second coordinate, a third coordinate, a fourth coordinate, a fifth coordinate, and a sixth coordinate in the xy chromaticity diagram, the first coordinate being a chromaticity coordinate for data of each of the pixels, the second coordinate being a chromaticity coordinate of an intersection point between a straight line for conversion and the first boundary line, the third coordinate being a chromaticity coordinate of an intersection point between the straight line for conversion and an outermost line expressing the color reproduction range based on the predetermined standard, the fourth coordinate being a chromaticity coordinate of an intersection point between the straight line for conversion and the second boundary line, the fifth coordinate being a chromaticity coordinate of an intersection point between the straight line for conversion and an outermost line expressing the color reproduction range of the output device, and the sixth coordinate being a chromaticity coordinate of an intersection point between the straight line for conversion and the third boundary line, the straight line for conversion being a straight line passing through a predetermined reference coordinate and the first coordinate, and
obtains a seventh coordinate, where a chromaticity coordinate of data after the conversion processing has been performed to the data of each of the pixels is taken as the seventh coordinate, such that, for the first color data, the seventh coordinate takes the first coordinate, such that, for the second color data, the seventh coordinate takes a chromaticity coordinate along the straight line for conversion closer to the fourth coordinate from the second coordinate by a distance obtained by multiplying a distance between the second coordinate and the fourth coordinate by a first factor expressed by a function of a basic factor where a value obtained by dividing a distance between the second coordinate and the first coordinate by a distance between the second coordinate and the third coordinate is taken as the basic factor, such that, for the third color data, the seventh coordinate takes a chromaticity coordinate along the straight line for conversion closer to the fifth coordinate from the fourth coordinate by a distance obtained by multiplying a distance between the fourth coordinate and the fifth coordinate by a first factor expressed by a function of a basic factor where a value obtained by dividing a distance between the third coordinate and the first coordinate by a distance between the third coordinate and the sixth coordinate is taken as the basic factor, and such that, for the fourth color data, the seventh coordinate takes the fifth coordinate.

5. The display device according to claim 4, wherein the display device is configured such that,
the XYZ data converting unit obtains the first factor for the second color data and the first factor for the third color data based on a following equation:

$$k_1 = 1 - e^{-kq}$$

where $k_1$ is the first factor, e is a base of natural logarithm, k is the basic factor, and q is a positive factor that is arbitrarily determinable to each of the second color data and the third color data.

6. The display device according to claim 4, wherein the image processing further includes:
a first look-up table that is configured to previously stores a plurality of values of the first factor each in association with a predetermined index for each of the second color data and the third color data, wherein
the XYZ data converting unit is configured to acquires a value of the first factor from the first look-up table using an index obtained based on the basic factor.

7. The display device according to claim 4, wherein the display device is configured such that,
the XYZ data converting unit obtains, when performing the conversion processing to the second color data and the third color data out of the data of each of the pixels included in the first XYZ data, a value of brightness for data of each of the pixels to be included in the second XYZ data based on a following equation by using a second factor expressed by a function of the basic factor:

$$Y_1 = ((1-k_2) + (Y_a \times k_2)) \times Y$$

where, $Y_1$ the brightness for the data of the corresponding pixel to be included in the second XYZ data, Y is the brightness for the data of the corresponding pixel included in the first XYZ data, $k_2$ is the second factor, and $Y_a$ is a value obtained by dividing a maximum value of brightness at the seventh coordinate by a maximum value of brightness at the first coordinate.

8. The display device according to claim 7, wherein the display device is configured such that,
the XYZ data converting unit obtains the second factor for the second color data and the second factor for the third color data based on a following equation:

$$k_2 = 1 - e^{kr}$$

where, $k_2$ is the second factor, e is a base of natural logarithm, k is the basic factor, and r is a positive factor that is arbitrarily determinable to each of the second color data and the third color data.

9. The display device according to claim 7, wherein the image processing device further includes:
a second look-up table that is configured to previously stores a plurality of values of the second factor each in association with a predetermined index for each of the second color data and the third color data, wherein the XYZ data converting unit is configured to acquires a value of the second factor from the second look-up table using an index obtained based on the basic factor.

10. The display device according to claim 1, wherein the display device is configured such that the first boundary line is provided such that a chromaticity coordinate of D65 which is a standard light source is included within the first boundary line.

11. The display device according to claim 1, wherein the display device is configured such that the first boundary line is provided such that chromaticity coordinates of memory colors including at least a white color and a flesh color are included within the first boundary.

12. The display device according to claim 1, wherein the inputted data is data complying with an xvYCC standard.

13. The display device according to claim 1, wherein the image processing device further includes:
a third color space converting unit configured to receive image data in a YCbCr colorimetric system as the inputted data and convert the image data in the YCbCr colorimetric system into image data in the RGB colorimetric system.

14. An image processing method of converting a color represented by inputted data into a color within a color reproduction range of a predetermined output device, the image processing method comprising:
a first color space converting step of converting image data in an RGB colorimetric system obtained based on the inputted data into first XYZ data which is image data in an XYZ colorimetric system, the inputted data being image data representing a color within a color reproduction range wider than the color reproduction range of the output device;
an XYZ data converting step of generating second XYZ data which is image data in the XYZ colorimetric system by performing predetermined conversion processing to X, Y, and Z values as tristimulus values that constitute the first XYZ data, the second XYZ data representing the color within the color reproduction range of the output device;
a second color space converting step of converting, at an image processing device, the second XYZ data into output image data in the RGB colorimetric system; and
a providing step of providing the output image data to a display panel for display by the display panel,
wherein, in the XYZ data converting step,
the first XYZ data is categorized into first color data, second color data, third color data, and fourth color data, the first color data representing a color within a color reproduction range corresponding to a first boundary line provided in an xy chromaticity diagram, the second color data representing a color having a chromaticity coordinate outside the first boundary line in the xy chromaticity diagram and within a color reproduction range based on a predetermined standard that is compatible with a standard for the inputted data, the third color data representing a color outside the color reproduction range based on the predetermined standard and within a color reproduction range corresponding to a third boundary line provided in the xy chromaticity diagram so as to include the color reproduction range of the output device, and the fourth color data representing a color having a chromaticity coordinate outside the third boundary line in the xy chromaticity diagram, and the conversion processing is performed to the X, Y, and Z values such that, for the first color data, a color represented by the first XYZ data is identical with a color represented by the second XYZ data, such that, for the second color data, the color reproduction range obtained by the second XYZ data is wider than the color reproduction range obtained by the first XYZ data, such that, for the third color data, the color represented by the second XYZ data has a chromaticity coordinate outside a second boundary line provided in the xy chromaticity diagram so as to include the color reproduction range based on the predetermined standard and is within the color reproduction range of the output device, and such that, for the fourth color data, the color represented by the second XYZ data has a chromaticity coordinate along an outermost line expressing color reproduction range of the output device in the xy chromaticity diagram.

15. The image processing method according to claim 14, wherein
in the XYZ data converting step, when the conversion processing is performed to data of each of pixels included in the first XYZ data,
a first coordinate, a second coordinate, a third coordinate, a fourth coordinate, a fifth coordinate, and a sixth coordinate are obtained in the xy chromaticity diagram, the first coordinate being a chromaticity coordinate for data of each of the pixels, the second coordinate being a chromaticity coordinate of an intersection point between a straight line for conversion and the first boundary line, the third coordinate being a chromaticity coordinate of an intersection point between the straight line for conversion and an outermost line expressing the color reproduction range based on the predetermined standard, the fourth coordinate being a chromaticity coordinate of an intersection point between the straight line for conversion and the second boundary line, the fifth coordinate being a chromaticity coordinate of an intersection point between the straight line for conversion and an outermost line expressing the color reproduction range of the output device, and the sixth coordinate being a Chromaticity coordinate of an intersection point between the straight line for conversion and the third boundary line, the straight line for conversion being a straight line passing through a predetermined reference coordinate and the first coordinate, and
a seventh coordinate is obtained out of chromaticity coordinates along the straight line for conversion, where a chromaticity coordinate of data after the conversion processing has been performed to the data of each of the pixels is taken as the seventh coordinate, such that, for the first color data, the first coordinate is identical with the seventh coordinate, such that, for the second color data, a proportion of a distance between the second coordinate and the first coordinate to a distance between the second coordinate and the third coordinate is equal to a proportion of a distance between the second coordinate and the seventh coordinate to a distance between the second coordinate and the fourth coordinate, such that, for the third color data, a proportion of a distance between the third coordinate and the first coordinate to a distance between the third coordinate and the sixth coordinate is equal to a proportion of a distance between the fourth coordinate and the seventh coordinate to a distance between the fourth coordinate and the fifth coordinate, and such that, for the fourth color data, the fifth coordinate is identical with the seventh coordinate.

16. The image processing method according to claim 15, wherein
in the XYZ data converting step, when the conversion processing is performed to the second color data, the third color data, and the fourth color data out of the data of each of the pixels included in the first XYZ data, a value of brightness for data of each of the pixels to be included in the second XYZ data is obtained such that a proportion of a maximum value of brightness at the seventh coordinate to a maximum value of brightness at the first coordinate is equal to a proportion of brightness for data after the conversion processing has been performed to the data of the corresponding pixel to brightness for the data of the corresponding pixel.

17. The image processing method according to claim 14, wherein
in the XYZ data converting step, when the conversion processing is performed to data of each of pixels included in the first XYZ data,
a first coordinate, a second coordinate, a third coordinate, a fourth coordinate, a fifth coordinate, and a sixth coordinate are obtained in the xy chromaticity diagram, the first coordinate being a chromaticity coordinate for data of each of the pixels, the second coordinate being a chromaticity coordinate of an intersection point between a straight line for conversion and the first boundary line, the third coordinate being a chromaticity coordinate of an intersection point between the straight line for conversion and an outermost line expressing the color reproduction range based on the predetermined standard, the fourth coordinate being a chromaticity coordinate of an intersection point between the straight fine for conversion and the second boundary line, the fifth coordinate being a chromaticity coordinate of an intersection point between the straight line for conversion and an outermost line expressing the color reproduction range of the output device, and the sixth coordinate being a chromaticity coordinate of an intersection point between the straight line for conversion and the third boundary line, the straight line for conversion being a straight line passing through a predetermined reference coordinate and the first coordinate, and
a seventh coordinate is obtained, where a chromaticity coordinate of data after the conversion processing has been performed to the data of each of the pixels is taken as the seventh coordinate, such that, for the first color data, the seventh coordinate takes the first coordinate, such that, for the second color data, the seventh coordinate takes a chromaticity coordinate along the straight line for conversion closer to the fourth coordinate from the second coordinate by a distance obtained by multiplying a distance between the second coordinate and the fourth coordinate by a first factor expressed by a function of a basic factor where a value obtained by dividing a distance between the second coordinate and the first coordinate by a distance between the second coordinate and the third coordinate is taken as the basic factor, such that, for the third color data, the seventh coordinate takes a, chromaticity coordinate along the straight line for conversion closer to the fifth coordinate from the fourth coordinate by a distance obtained by multiplying a distance between the fourth coordinate and the fifth coordinate by a first factor expressed by a function of a basic factor where a value obtained by dividing a distance between the third coordinate and the first coordinate by a distance between the third coordinate and the sixth coordinate is taken as the basic factor, and such that, for the fourth color data, the seventh coordinate takes the fifth coordinate.

18. The image processing method according to claim 17, wherein
in the XYZ data converting step, the first factor for the second color data and the first factor for the third color data are obtained based On a following equation:

$$k_1 = 1 - e^{-kq}$$

where $k_1$ is the first factor, e is a base of natural logarithm, k is the basic factor, and q is a positive factor that is arbitrarily determinable to each of the second color data and the third color data.

19. The image processing method according to claim 17, wherein
in the XYZ data converting step, a value of the first factor is acquired from a first look-up table using an index obtained based on the basic factor, the first look-up table previously storing a plurality of values of the first factor each in association with a predetermined index for each of the second color data and the third color data.

20. The image processing method according to claim 17, wherein
in the XYZ data converting step, when the conversion processing is performed to the second color data and the third color data out of the data of each of the pixels included in the first XYZ data, a value of brightness for data of each of the pixels to be included in the second XYZ data is obtained based on a following equation by using a second factor expressed by a function of the basic factor:

$$Y_1 = ((1 - k_2) + (Y_a \times K_2)) \times Y$$

where, $Y_1$ is the brightness for the data of the corresponding pixel to be included in the second XYZ data, Y is the brightness for the data of the corresponding pixel included in the first XYZ data, $k_2$ is the second factor, and $Y_a$ is a value obtained by dividing a maximum value of brightness at the seventh coordinate by a maximum value of brightness at the first coordinate.

21. The image processing method according to claim 20, wherein
in the XYZ data converting step, the second factor for the second color data and the second factor for the third color data are obtained based on a following equation:

$$k_2 = 1 - e^{-kr}$$

where, $k_2$ is the second factor, e is a base of natural logarithm, k is the basic factor, and r is a positive factor that is arbitrarily determinable to each of the second color data and the third color data.

22. The image processing method according to claim 20, wherein in the XYZ data converting step, a value of the second factor is acquired from a second look-up table using an index obtained based on the basic factor, the second look-up table previously storing a plurality of values of the second factor each in association with a predetermined index for each of the second color data and the third color data.

23. The image processing method according to claim 14, wherein
the first boundary line is provided such that a chromaticity coordinate of D65 which is a standard light source is included within the first boundary line.

24. The image processing method according to claim 14, wherein
the first boundary line is provided such that chromaticity coordinates of memory colors including at least a white color and a flesh color are included within the first boundary.

25. The image processing method according to claim 14, wherein
the inputted data is data complying with an xvYCC standard.

26. The image processing method according to claim 14, further comprising:
a third color space converting step of converting image data in a YCbCr colorimetric system as the inputted data into image data in the RGB colorimetric system.

\* \* \* \* \*

UNITED STATES PATENT AND TRADEMARK OFFICE
CERTIFICATE OF CORRECTION

PATENT NO. : 8,890,884 B2
APPLICATION NO. : 13/500474
DATED : November 18, 2014
INVENTOR(S) : Xiaomang Zhang Page 1 of 1

It is certified that error appears in the above-identified patent and that said Letters Patent is hereby corrected as shown below:

On the Title Page, Item (87)

Applicant notes that the PCT Publication Date of the invention appearing on the page 1 of U.S. Patent No. 8,890,864 is erroneously printed. The correct PCT Publication Date of the invention should read May 26, 2011.

Signed and Sealed this
Thirtieth Day of June, 2015

Michelle K. Lee
*Director of the United States Patent and Trademark Office*